US012738993B2

(12) United States Patent
Hao et al.

(10) Patent No.: US 12,738,993 B2
(45) Date of Patent: Sep. 15, 2026

(54) PORT-SELECTION CODEBOOK WITH FREQUENCY SELECTIVE PRECODED CSI-RS

(71) Applicant: QUALCOMM Incorporated, San Diego, CA (US)

(72) Inventors: Chenxi Hao, Beijing (CN); Yu Zhang, San Diego, CA (US); Liangming Wu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 18/012,512

(22) PCT Filed: Mar. 31, 2021

(86) PCT No.: PCT/CN2021/084401
§ 371 (c)(1),
(2) Date: Dec. 22, 2022

(87) PCT Pub. No.: WO2022/027985
PCT Pub. Date: Feb. 10, 2022

(65) Prior Publication Data
US 2023/0261831 A1 Aug. 17, 2023

(30) Foreign Application Priority Data
Aug. 5, 2020 (WO) ................ PCT/CN2020/106976

(51) Int. Cl.
*H04B 7/0456* (2017.01)
*H04B 7/06* (2006.01)
(Continued)

(52) U.S. Cl.
CPC ......... *H04B 7/0479* (2023.05); *H04B 7/0626* (2013.01); *H04B 7/0639* (2013.01);
(Continued)

(58) Field of Classification Search
None
See application file for complete search history.

(56) References Cited

U.S. PATENT DOCUMENTS 9,438,451 B2 * 9/2016 Chen .................... H04B 7/0413
10,790,888 B2 * 9/2020 Park ..................... H04B 7/0479
(Continued)

FOREIGN PATENT DOCUMENTS

CN 109219120 A 1/2019
CN 109802804 A 5/2019

OTHER PUBLICATIONS

Huawei, et al., "Discussion on Non-Precoded CSI-RS up to 32 CSI-RS Ports," 3GPP TSG RAN WG1 Meeting #86bis, R1-1608600, Oct. 10-14, 2016, (Oct. 14, 2016), the whole document, 6 pages.
(Continued)

*Primary Examiner* — Bob A Phunkulh
(74) *Attorney, Agent, or Firm* — Procopio, Cory, Hargreaves & Savitch LLP/Qualcomm

(57) ABSTRACT

A configuration to configure a UE to receive a plurality of CSI-RS ports where different ports may be transmitted on different sets of RBs within the frequency band of the CSI-RS. The apparatus receives CSI-RS through a plurality of CSI-RS ports, wherein different CSI-RS ports of the plurality of CSI-RS ports are transmitted on a different set of RBs. The apparatus reports at least one CSI based on a CSI-RS pattern.

27 Claims, 17 Drawing Sheets

(51) Int. Cl.

| | |
|---|---|
| ***H04L 5/00*** | (2006.01) |
| *H04W 24/10* | (2009.01) |
| *H04W 72/23* | (2023.01) |

(52) U.S. Cl.

CPC ........... *H04L 5/0051* (2013.01); *H04W 24/10* (2013.01); *H04W 72/23* (2023.01)

(56) References Cited

U.S. PATENT DOCUMENTS

| | | | | |
|---|---|---|---|---|
| 11,394,518 | B2 * | 7/2022 | Gao | H04B 17/309 |
| 11,405,085 | B2 * | 8/2022 | Gao | H04W 72/04 |
| 2012/0113816 | A1 * | 5/2012 | Bhattad | H04L 25/0226<br>370/246 |
| 2013/0128761 | A1 * | 5/2013 | Kang | H04W 72/046<br>370/252 |
| 2015/0341942 | A1 | 11/2015 | Lee et al. | |
| 2016/0156401 | A1 * | 6/2016 | Onggosanusi | H04B 7/0482<br>370/329 |
| 2017/0180194 | A1 * | 6/2017 | Noh | H04B 7/0413 |
| 2017/0195031 | A1 | 7/2017 | Onggosanusi et al. | |
| 2018/0254812 | A1 * | 9/2018 | Park | H04L 5/005 |
| 2019/0181936 | A1 * | 6/2019 | Park | H04W 76/27 |
| 2019/0215136 | A1 * | 7/2019 | Zhou | H04L 1/1819 |
| 2019/0273547 | A1 | 9/2019 | Onggosanusi et al. | |
| 2019/0334602 | A1 * | 10/2019 | Liu | H04L 25/0224 |
| 2019/0357221 | A1 | 11/2019 | Davydov et al. | |
| 2020/0044803 | A1 * | 2/2020 | Li | H04L 5/0048 |
| 2020/0106504 | A1 | 4/2020 | Noh et al. | |
| 2021/0014893 | A1 * | 1/2021 | Park | H04L 5/0092 |
| 2021/0028912 | A1 * | 1/2021 | Xu | H04L 5/0098 |
| 2021/0029650 | A1 * | 1/2021 | Cirik | H04W 52/242 |
| 2021/0037484 | A1 * | 2/2021 | Zhou | H04W 52/386 |
| 2021/0167930 | A1 * | 6/2021 | Jeon | H04B 7/0626 |
| 2021/0176001 | A1 * | 6/2021 | Li | H04L 1/0027 |
| 2021/0376976 | A1 * | 12/2021 | Li | H04L 5/0048 |
| 2022/0166486 | A1 * | 5/2022 | Sun | H04B 7/0417 |
| 2022/0182121 | A1 * | 6/2022 | Li | H04B 7/0456 |
| 2022/0239360 | A1 * | 7/2022 | Faxér | H04B 7/0636 |
| 2023/0093335 | A1 * | 3/2023 | Harrison | H04B 7/0617<br>370/329 |
| 2023/0155758 | A1 * | 5/2023 | Park | H04L 27/261<br>370/329 |

OTHER PUBLICATIONS

International Search Report and Written Opinion—PCT/CN2020/106976—ISA/EPO—Apr. 25, 2021.

International Search Report and Written Opinion—PCT/CN2021/084401—ISA/EPO—Apr. 27, 2021.

* cited by examiner

400

| | FD unit 0 | FD unit 1 | ... | FD unit $N_3 - 1$ |
|---|---|---|---|---|
| Port 3000 | $\boldsymbol{b}_0 \cdot \boldsymbol{f}_0^H[0]$ | $\boldsymbol{b}_0 \cdot \boldsymbol{f}_0^H[1]$ | ... | $\boldsymbol{b}_0 \cdot \boldsymbol{f}_0^H[N_3 - 1]$ |
| Port 3001 | $\boldsymbol{b}_0 \cdot \boldsymbol{f}_1^H[0]$ | $\boldsymbol{b}_0 \cdot \boldsymbol{f}_1^H[1]$ | ... | $\boldsymbol{b}_0 \cdot \boldsymbol{f}_1^H[N_3 - 1]$ |
| Port 3002 | $\boldsymbol{b}_1 \cdot \boldsymbol{f}_0^H[0]$ | $\boldsymbol{b}_1 \cdot \boldsymbol{f}_0^H[1]$ | ... | $\boldsymbol{b}_1 \cdot \boldsymbol{f}_0^H[N_3 - 1]$ |
| Port 3003 | $\boldsymbol{b}_1 \cdot \boldsymbol{f}_1^H[0]$ | $\boldsymbol{b}_1 \cdot \boldsymbol{f}_1^H[1]$ | ... | $\boldsymbol{b}_1 \cdot \boldsymbol{f}_1^H[N_3 - 1]$ |

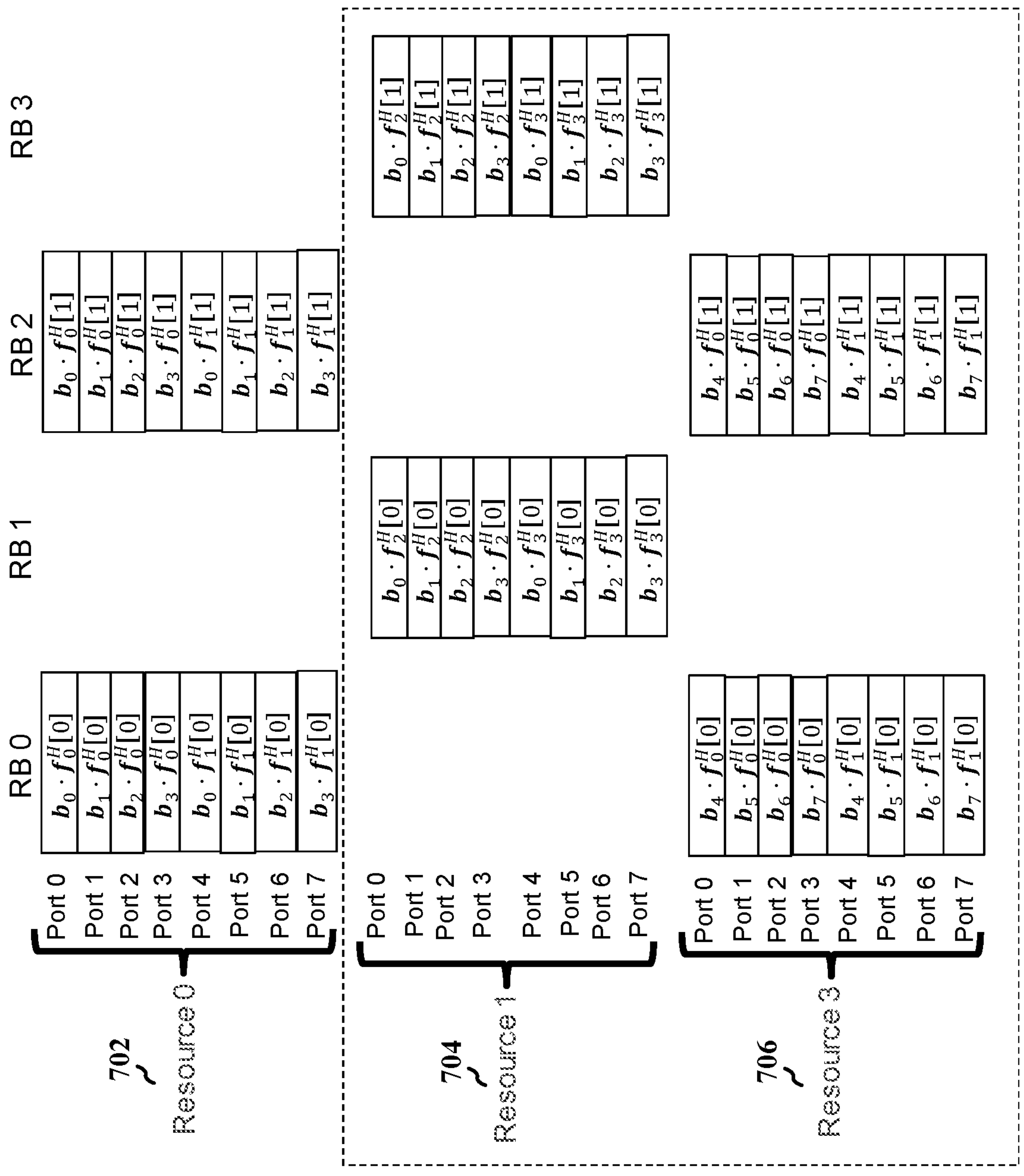

FIG. 7

| Resource | Port | RB 0 | RB 1 | RB 2 | RB 3 |
| --- | --- | --- | --- | --- | --- |
| 702 Resource 0 | Port 0 | $b_0 \cdot f_0^H[0]$ | | $b_0 \cdot f_0^H[1]$ | |
| | Port 1 | $b_1 \cdot f_0^H[0]$ | | $b_1 \cdot f_0^H[1]$ | |
| | Port 2 | $b_2 \cdot f_0^H[0]$ | | $b_2 \cdot f_0^H[1]$ | |
| | Port 3 | $b_3 \cdot f_0^H[0]$ | | $b_3 \cdot f_0^H[1]$ | |
| | Port 4 | $b_0 \cdot f_1^H[0]$ | | $b_0 \cdot f_1^H[1]$ | |
| | Port 5 | $b_1 \cdot f_1^H[0]$ | | $b_1 \cdot f_1^H[1]$ | |
| | Port 6 | $b_2 \cdot f_1^H[0]$ | | $b_2 \cdot f_1^H[1]$ | |
| | Port 7 | $b_3 \cdot f_1^H[0]$ | | $b_3 \cdot f_1^H[1]$ | |
| 704 Resource 1 | Port 0 | | $b_0 \cdot f_2^H[0]$ | | $b_0 \cdot f_2^H[1]$ |
| | Port 1 | | $b_1 \cdot f_2^H[0]$ | | $b_1 \cdot f_2^H[1]$ |
| | Port 2 | | $b_2 \cdot f_2^H[0]$ | | $b_2 \cdot f_2^H[1]$ |
| | Port 3 | | $b_3 \cdot f_2^H[0]$ | | $b_3 \cdot f_2^H[1]$ |
| | Port 4 | | $b_0 \cdot f_3^H[0]$ | | $b_0 \cdot f_3^H[1]$ |
| | Port 5 | | $b_1 \cdot f_3^H[0]$ | | $b_1 \cdot f_3^H[1]$ |
| | Port 6 | | $b_2 \cdot f_3^H[0]$ | | $b_2 \cdot f_3^H[1]$ |
| | Port 7 | | $b_3 \cdot f_3^H[0]$ | | $b_3 \cdot f_3^H[1]$ |
| 706 Resource 3 | Port 0 | $b_4 \cdot f_0^H[0]$ | | $b_4 \cdot f_0^H[1]$ | |
| | Port 1 | $b_5 \cdot f_0^H[0]$ | | $b_5 \cdot f_0^H[1]$ | |
| | Port 2 | $b_6 \cdot f_0^H[0]$ | | $b_6 \cdot f_0^H[1]$ | |
| | Port 3 | $b_7 \cdot f_0^H[0]$ | | $b_7 \cdot f_0^H[1]$ | |
| | Port 4 | $b_4 \cdot f_1^H[0]$ | | $b_4 \cdot f_1^H[1]$ | |
| | Port 5 | $b_5 \cdot f_1^H[0]$ | | $b_5 \cdot f_1^H[1]$ | |
| | Port 6 | $b_6 \cdot f_1^H[0]$ | | $b_6 \cdot f_1^H[1]$ | |
| | Port 7 | $b_7 \cdot f_1^H[0]$ | | $b_7 \cdot f_1^H[1]$ | |

1500

1502

1504

```
NZP-CSI-RS-ResourceSet ::=        SEQUENCE {
  nzp-CSI-ResourceSetId           NZP-CSI-RS-ResourceSetId,
  nzp-CSI-RS-Resources            SEQUENCE (SIZE (1..maxNrofNZP-CSI-RS-ResourcesPerSet)) OF NZP-CSI-RS-ResourceId,
  additional-nzp-CSI-RS-Resources-r17 SEQUENCE (SIZE (1..maxNrofNZP-CSI-RS-ResourcesPerSet)) OF additional-NZP-CSI-RS-ResourceId
  repetition                ENUMERATED { on, off }                 OPTIONAL,  -- Need S
  aperiodicTriggeringOffset      INTEGER(0..6)                     OPTIONAL,  -- Need S
  trs-Info                  ENUMERATED {true}                      OPTIONAL,  -- Need R
  ...,
  [[
  aperiodicTriggeringOffset-r16    INTEGER(0..31)                  OPTIONAL  -- Need S
  ]]
}
```

```
additional-NZP-CSI-RS-Resource ::=          SEQUENCE {
    additional-nzp-CSI-RS-ResourceId            additional-NZP-CSI-RS-ResourceId,
    density                                 CHOICE {
        dot5                                    ENUMERATED {evenPRBs, oddPRBs},
        one                                     NULL,
        three                                   NULL,
        spare                                   NULL
    }
}
```

1506 If different RB-comb

```
additional-NZP-CSI-RS-Resource ::=          SEQUENCE {
    additional-nzp-CSI-RS-ResourceId            additional-NZP-CSI-RS-ResourceId,
    frequencyDomainAllocation               CHOICE {
        row1                                    BIT STRING (SIZE (4)),
        row2                                    BIT STRING (SIZE (12)),
        row4                                    BIT STRING (SIZE (3)),
        other                                   BIT STRING (SIZE (6))
    }
}
```

1508 If different RE location

```
additional-NZP-CSI-RS-Resource ::=          SEQUENCE {
    additional-nzp-CSI-RS-ResourceId            additional-NZP-CSI-RS-ResourceId,
    firstOFDMSymbolInTimeDomain             INTEGER (0..13),
    firstOFDMSymbolInTimeDomain2            INTEGER (2..12)
}
```

1510 If different symbol location

FIG. 15

PORT-SELECTION CODEBOOK WITH FREQUENCY SELECTIVE PRECODED CSI-RS

CROSS REFERENCE TO RELATED APPLICATION(S)

This application is a National Stage Application filed under 35 U.S.C. § 371 of PCT International Application No. PCT/CN2021/084401, entitled "Port-Selection Codebook with Frequency Selective Precoded CSI-RS" and filed Mar. 31, 2021, which claims the benefit of International Application Serial No. PCT/CN2020/106976, entitled "Port-Selection Codebook with Frequency Selective Precoded CSI-RS" and filed on Aug. 5, 2020, which are expressly incorporated by reference herein in their entirety.

BACKGROUND

Technical Field

The present disclosure relates generally to communication systems, and more particularly, to wireless communication including frequency selective precoded channel state information reference signal (CSI-RS).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives channel state information (CSI) reference signals (RS) (CSI-RS) through a plurality of CSI-RS ports, wherein different CSI-RS ports of the plurality of CSI-RS ports are transmitted on a different set of resource blocks (RBs). The apparatus reports at least one CSI based on a CSI-RS pattern.

In an aspect of the disclosure, a method, a computer-readable medium, and an apparatus are provided. The apparatus may be a device at a base station. The device may be a processor and/or a modem at a base station or the base station itself. The apparatus transmits channel state information (CSI) reference signals (RS) (CSI-RS) through a plurality of CSI-RS ports, wherein different CSI-RS ports of the plurality of CSI-RS ports are transmitted on a different set of resource blocks (RBs). The apparatus receives at least one CSI report based on the transmitted CSI-RS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram illustrating an example of frequency selective precoding.

FIG. 7 is a diagram illustrating an example of a transmission of a plurality of CSI-RS ports.

FIG. 15 is a diagram illustrating an example of a message format.

DETAILED DESCRIPTION

Figure 1:
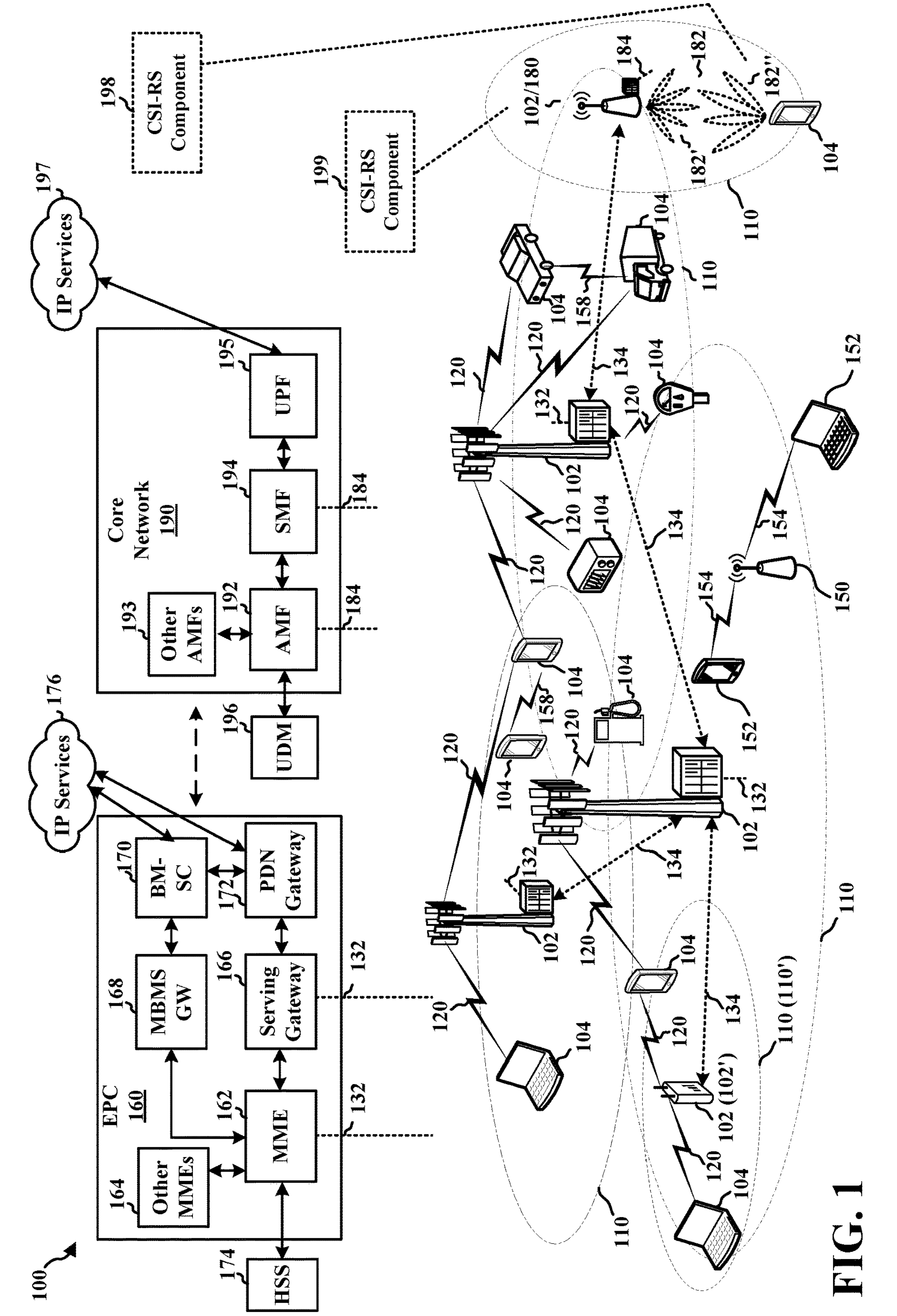
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive a plurality of CSI-RS ports where different ports may be transmitted on different sets of RBs. For example, the UE 104 may comprise a CSI-RS component 198 configured to receive CSI-RS through a plurality of CSI-RS ports. The UE 104 receives CSI-RS through a plurality of CSI-RS ports, wherein different CSI-RS ports of the plurality of CSI-RS ports are transmitted on different sets of RBs. The UE 104 reports at least one CSI based on a CSI-RS pattern.

Referring again to FIG. 1, in certain aspects, the base station 180 may be configured to transmit a plurality of CSI-RS ports where different ports may be transmitted on different sets of RBs. For example, the base station 180 may comprise a CSI-RS component 199 configured to transmit CSI-RS through a plurality of CSI-RS ports. The base station 180 transmits CSI-RS through a plurality of CSI-RS ports, where different CSI-RS ports of the plurality of CSI-RS ports are transmitted on different sets of RBs. The base station 180 receives at least one CSI report based on the transmitted CSI-RS.

Although the following description may be focused on 5G NR, the concepts described herein may be applicable to other similar areas, such as LTE, LTE-A, CDMA, GSM, and other wireless technologies.

Figures 2A, 2B, 2C, 2D:
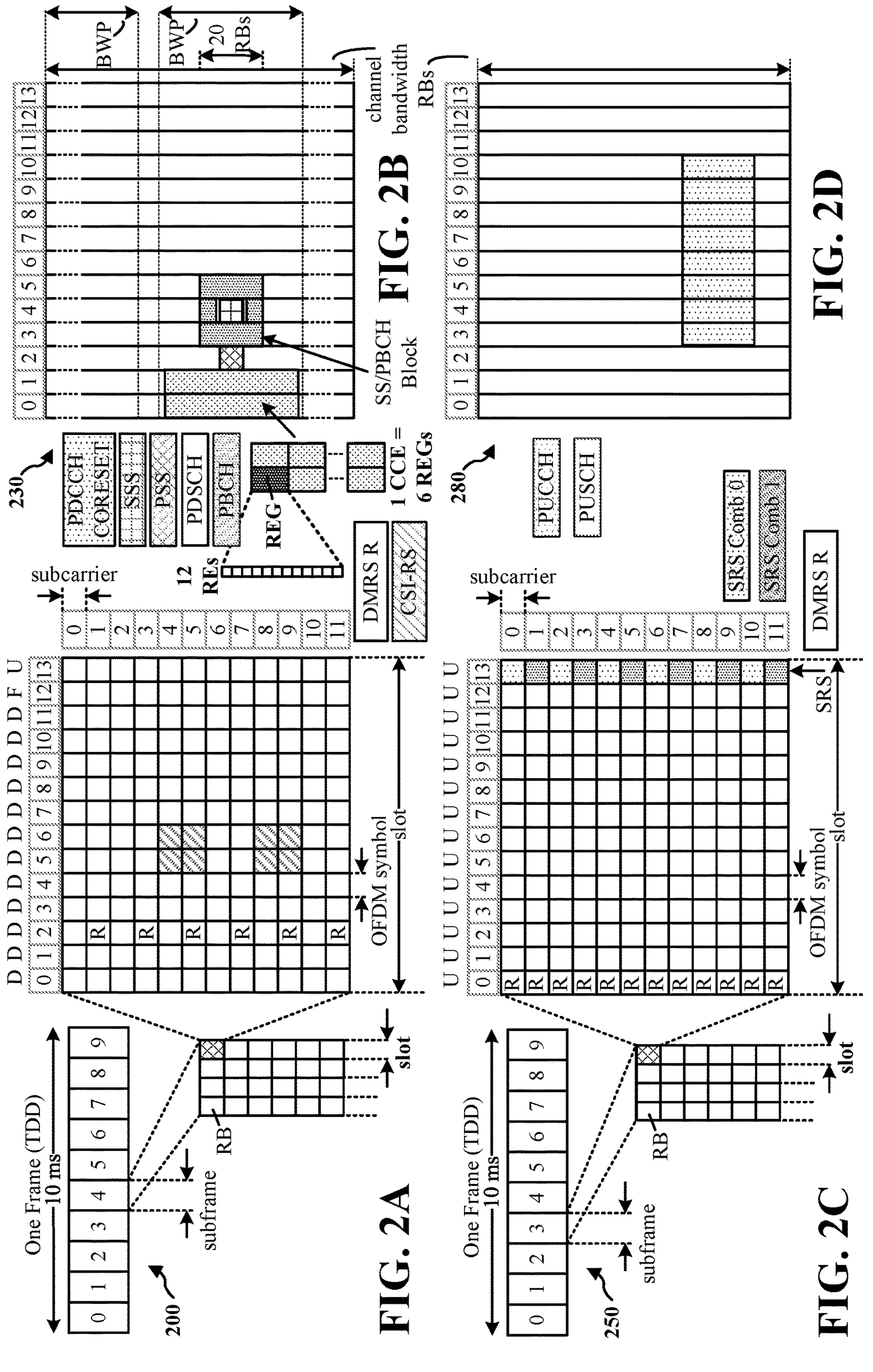
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
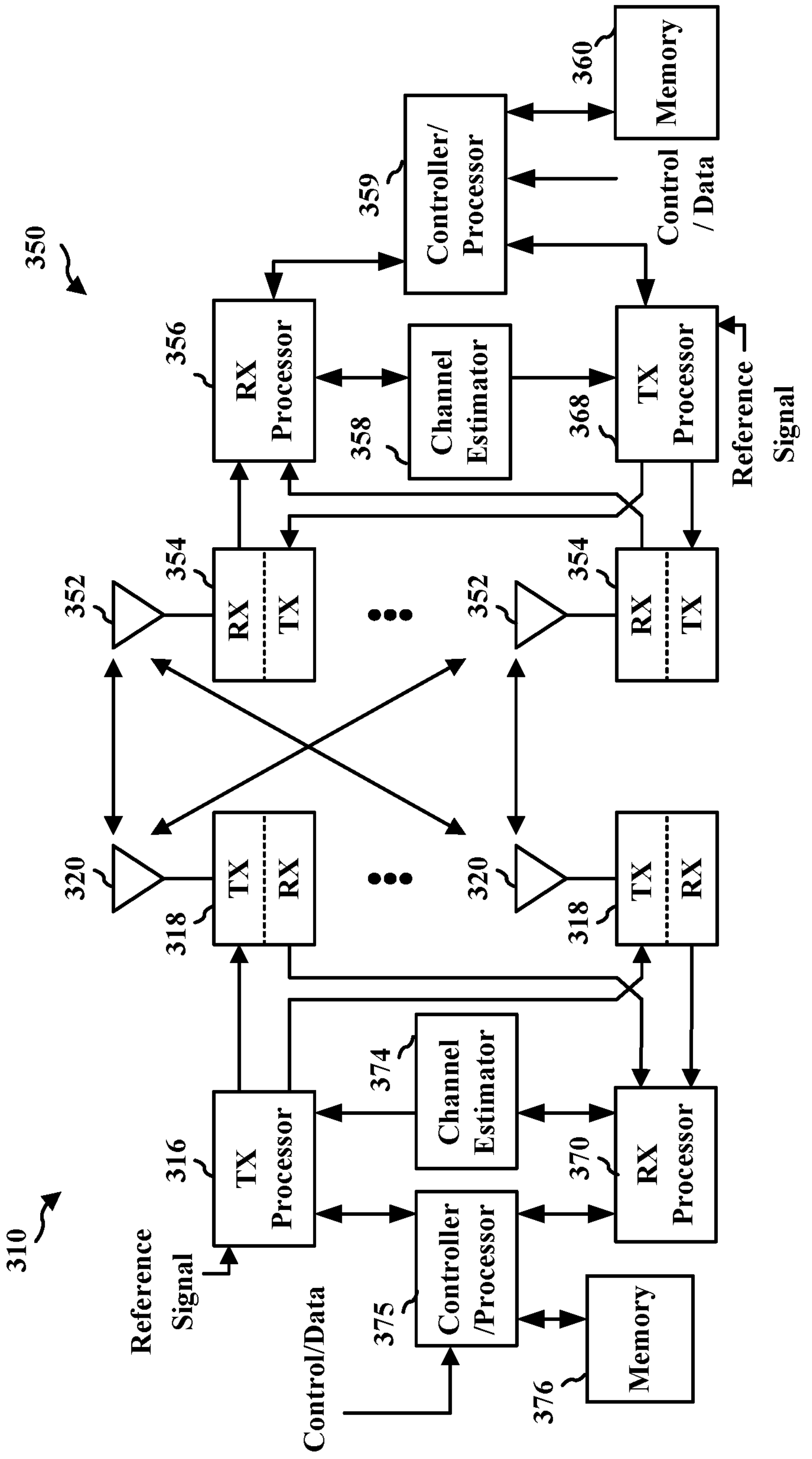
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems, a UE may report CSI based on a measurement on CSI-RS. A network (e.g., via a base station) may transmit, to the UE, a non-precoded CSI-RS, e.g., P=32 ports with each port transmitted via a single transmit antenna. The UE may be triggered to report an enhanced type II (eType II) CSI. In eType II CSI, the UE may report a precoding matrix indicator (PMI) which may indicate the precoder for each layer. The precoder for each layer across N3 subbands is written as $$\sum_{i=0}^{2L-1}\sum_{m=0}^{M-1} b_i \cdot c_{i,m} \cdot f_m^H$$

with size P*N3, where $b_i$ is the spatial domain (SD) basis with size $$P*1,\ f_m^H$$

is the frequency domain (FD) basis with size N3*1, $c_{i,m}$ is the coefficient used to combine the 2L SD bases and N3 FD bases. More specifically, the first L SD bases are written as $$b_i = \begin{bmatrix} \bar{b}_i \\ 0 \end{bmatrix},$$

i=0, 1, . . . L−1 and last L SD bases are written as $$b_i = \begin{bmatrix} 0 \\ \bar{b}_{i-L} \end{bmatrix},$$

i=L, L+1, . . . 2L−1. This means that UE will select L beams $\bar{b}_i$ and each beam is applied to first polarization and second polarization. The first half of the ports are transmitted assuming using a first polarization, the second half of the ports are transmitted assuming using a second polarization. The motivation of this codebook structure is for CSI reporting payload reduction. Without compression of payload, the UE may need to report P*N3 coefficients for each layer. With the structure of eType II, SD basis compresses the spatial domain dimension from P to 2L by exploiting SD domain correlation, FD basis compresses the frequency dimension from N3 to M by exploiting FD correlation. In the remaining 2L*M dimension, the number of non-zero coefficients may be small, so that the total number of CSI payload is decreased. The UE will report indexes of b, indexes of f from predefined set, and report c with quantization.

The network may send precoded CSI-RS via spatial domain basis based on spatial reciprocity, and the UE may report an eType II port-selection codebook. In eType II port-selection codebook, the precoder for a certain layer is written as $$\sum_{i=0}^{2L-1}\sum_{m=0}^{M-1} v_i \cdot c_{i,m} \cdot f_m^H,$$

the difference compared to regular eType II CSI is that the SD basis is replaced by port-selection vector v wherein there is only one single non-zero value (e.g., 1) in v meaning that the corresponding port is selected. This is because each CSI-RS port is precoded by an SD basis, then at the UE side selecting an SD basis is equivalent to selecting a port. The UE will report the selected ports, report f from predefined set, and report c with quantization.

In some instances, the network may precode CSI-RS via the spatial domain basis and the frequency domain basis, such that the UE only reports the linear combination coefficients to the network in the CSI reporting. At least one advantage of the network precoding CSI-RS via the spatial domain basis and the frequency domain basis is that the UE has a reduced reporting overhead and a reduced complexity.

FIG. 4 is a diagram 400 illustrating an example of frequency selective precoding. For frequency selective precoding, on a frequency domain (FD) unit (e.g., RB or subband), the precoder of a CSI-RS port may be formed by a pair of spatial domain basis (or spatial domain transmission filter), and a frequency domain basis (e.g., frequency domain transmission filter/weight). The precoder of a CSI-RS port p, on a frequency domain unit n, is written as $$b_{i(p)} f_{m(p)}^H[n],$$

where $b_{i(p)}$ is the SD basis applied on port p, $$f_{m(p)}^H[n]$$

is the n-th entry of the FD basis applied on port p. For a port p, a UE may observe $$\hat{H}_p[n] = Hb_{i(p)} f_{m(p)}^H[n],$$

on a frequency domain unit n, for the UE to calculate the CSI, where H is a wireless channel between a UE and the network without precoding. For each layer, the UE may select a subset of total ports and report single coefficient per port across the frequency band. For example, the PMI for a certain layer on any of the $N_3$ FD units may be described by the expression:

$$W = \sum_{k=0}^{K_0-1} v_{i_k} \cdot c_k,$$

where $v_{i_k}$ is of size P×1 with only one "1" in row $i_k$, and P is the total number of CSI-RS ports.

The UE may report $v_{i_0}$, . . .

$$v_{i_{K_0-1}}$$

and $c_0$, . . . $c_{K_0-1}$ or a subset of $c_0$, . . . $c_{K_0-1}$, wherein the unreported are set to 0. For layer-to-port mapping, the UE may calculate channel quality information (CQI) assuming a virtual PDSCH, as described in the following expression:

$$\begin{bmatrix} y^{(3000)} \\ \vdots \\ y^{(3000+P-1)} \end{bmatrix} = W \begin{bmatrix} x^{(0)} \\ \vdots \\ x^{(v-1)} \end{bmatrix}$$

The actual precoder of the virtual PDSCH may be described in the following expression:

$$\left[b_{i(3000)} f_{m(3000)}^H, \ldots, b_{i(3000+P-1)} f_{m(3000+P-1)}^H\right] \times \sum_{k=0}^{K_0-1} v_{i_k} \cdot c_k$$

In some instances, such as in instances of poor uplink/downlink reciprocity, the network may determine the SD/FD combination used to precode each CSI-RS port. However, the uplink/downlink reciprocity may be poor due to receive/transmission calibration error and practical sounding error, such that the performance of the reciprocity may be bad. In other words, the SD vector and the FD vector determined by the network may not accurately capture the channel characteristic. In such instances, the UE may be best configured to determine the SD vector and the FD vector. To compensate for the poor reciprocity, the network may emulate more CSI-RS ports (e.g., 32 ports or even more than 32 ports) for each UE. The network may determine the dominant SD-FD combination based on the uplink channel, but the dominant SD-FD combination may be biased from dominant SD-FD combination in the downlink channel. Emulating more CSI-RS ports may provide the UE with more options to select the dominant ports (e.g., dominant SD-FD combination). However, this may lead to an increase in reference signal (RS) overhead due to CSI-RS being UE specific.

In some instances, another option to improve the performance at poor uplink/downlink reciprocity is to let UE report FD bases. In some instances, another option to improve the performance at poor reciprocity is that the network may configure FD bases to UEs in additional to use the determined SD and FD bases for CSI-RS precoding. This approach can increase total number of SD-FD combinations without increasing number of CSI-RS ports. In these two options, the PMI reported by UE has a similar structure as eType II codebook. In this case, the codebook has three-stage codebook, i.e., a precoder for a layer across N3 subbands being W1*W2*Wf where W1 is the port selection matrix, Wf is the FD bases reported by UE or configured by the network. Alternatively, the precoder for a certain layer l on N3 subbands can be written as $$W_l = \sum_{i=0}^{2L_l-1}\sum_{m=0}^{M_l-1} v_{i,l} \cdot c_{i,m,l} \cdot f_{m,l}^H$$

with size P*N3, where $v_i$ is the P*1 port-selection vector, $f_m$ is the N3*1 FD basis reported by UE or configured by network. There can be $L_l$ ports selected for layer l and $M_l$ FD bases configured or reported for layer l. $L_l$ and $M_l$ can be layer common or layer specific, or rank-common or rank-specific.

For layer-to-port mapping, the UE may calculate channel quality information (CQI) assuming a virtual PDSCH, as described in the following expression:

$$\begin{bmatrix} y^{(3000)} \\ \vdots \\ y^{(3000+P-1)} \end{bmatrix} = W \begin{bmatrix} x^{(0)} \\ \vdots \\ x^{(\nu-1)} \end{bmatrix}.$$

Here, port 3000 to 3000+P−1 are the indices of the CSI-RS ports within one CSI-RS resource. The actual precoder of the virtual PDSCH may be described in the following expression:

$$\left[b_{i(3000)}f^{H}_{m(3000)}, \ldots , b_{i(3000+P-1)}f^{H}_{m(3000+P-1)}\right] \times \sum_{i=0}^{2L_l-1}\sum_{m=0}^{M_l-1} v_{i,l}\cdot c_{i,m,l}\cdot f^{H}_{m,l}$$

A port selection codebook may be enhanced to improve utilization of DL/UL reciprocity of angle and/or delay. CSI-RS configurations associated with port selection codebook may support low CSI-RS overhead and/or CSI-RS processing complexity considering the impact on UPT performance under realistic CSI-RS measurement. In some instances, CSI-RS may support configuring a lower CSI-RS density per CSI-RS resource (e.g., density of 0.25). In some instances, CSI-RS may support configuring one or more CSI-RS patterns per CSI-RS resource associated with the port selection codebook. In some instances, CSI-RS may support configuring one or more CSI-RS resources per CSI reporting configuration associated with the port selection codebook. However, a need exists for detailed signaling methods for multi-resource based solutions and a clarification of interference measurement resource configuration, CPU counting and resource/port counting for a multi-resource based solution.

Aspects presented herein provide configurations that enable a UE to receive a plurality of CSI-RS ports, where different ports may be transmitted on different sets of RBs within the frequency band of the CSI-RS. The plurality of CSI-RS ports may be within a plurality of CSI-RS resources Ks, wherein the CSI-RS ports within each resource is transmitted on a corresponding set of RBs. The UE may report a CSI comprising a port selection and a linear combination coefficients used to combine the selected ports.

In some instances, there may be N ports in total divided into M groups each having $N_1$, $N_2$, . . . $N_M$ ports in each group. The ports within each group may be transmitted on a specific set of RBs, for example: $N_1$ ports in group 1 are transmitted on RB 0, M, 2M, etc.; $N_2$ ports in group 2 are transmitted on RB 1, M+1, 2M+1, etc; . . . ; $N_M$ ports in group M are transmitted on RB M−1, 2M−1, 3M−1, etc. In some aspects, the RB set of different groups may be the same or different.

Figure 5:
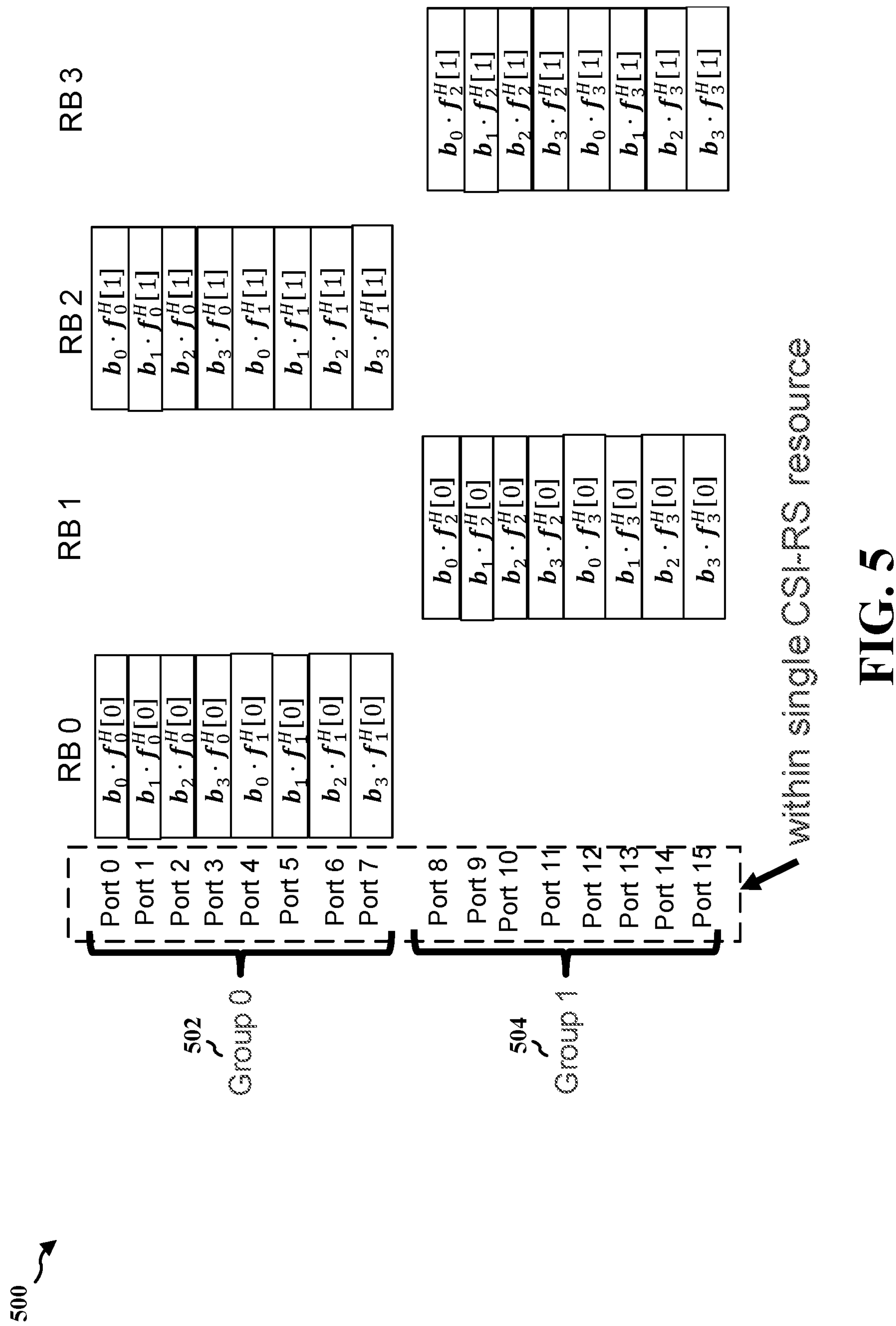
FIG. 5 is a diagram illustrating an example of a transmission of a plurality of CSI-RS ports.

FIG. 5 is a diagram 500 illustrating an example of a transmission of a plurality of CSI-RS ports. In some aspects, the total N groups may be in one resource, and the grouping may be done within a single resource (e.g., Group 0 502 of resource 0, Group 1 504 of resource 0, but group 0 and group 1 are transmitted on different RBs). In some aspects, an additional field in a non-zero power (NZP) CSI-RS resource configuration may indicate the shifted ports. The number of groups may be explicitly configured in NZP-CSI-RS resource configuration or NZP-CSI-RS resource set configuration. The number of groups may be determined based on a CSI-RS density configuration. For example, a density of 0.5 may result in two groups. More generally, for density d, there will be 1/d groups. The N ports may be evenly divided into the M groups. The N ports may be sequentially mapped into each group. For example, for instances having 16 ports (e.g., index 3000-3015) with a density of 0.5, CSI-RS ports 3000-3007 may be in group 1 and mapped to even RBs (e.g., RB 0 or RB 2), while ports 3008-3015 may be in group 2 and mapped to odd RBs (e.g., RB 1 or RB 3). The port selection may be a free-selection of the total ports.

Figure 6:
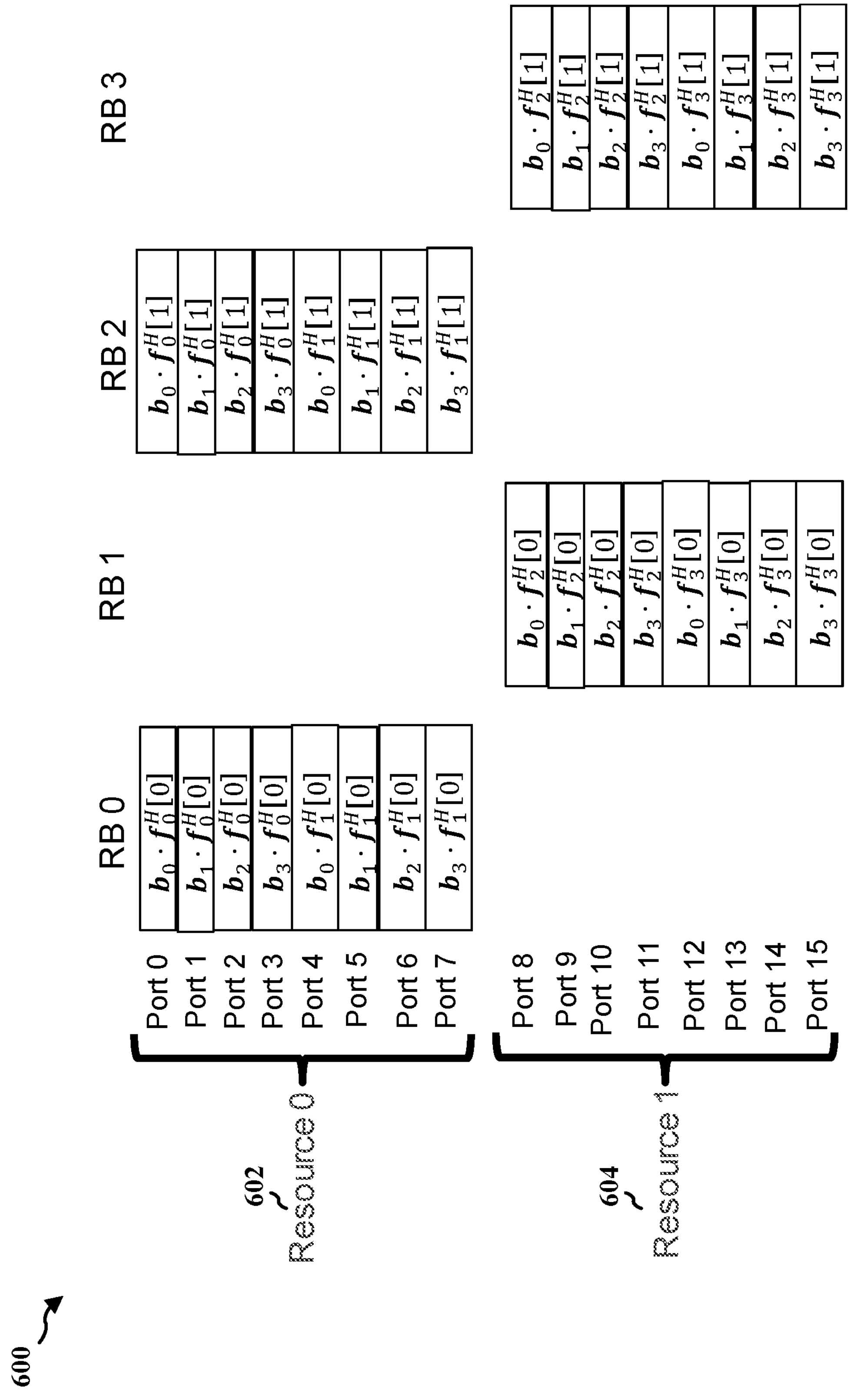
FIG. 6 is a diagram illustrating an example of a transmission of a plurality of CSI-RS ports.

FIG. 6 is a diagram 600 illustrating an example of a transmission of a plurality of CSI-RS ports. In some aspects, as shown in FIG. 6, the total N ports may be across Ks resources, where Ks≥M. Each resource may comprise the same number of ports P, and may be transmitted on a specific set of RBs. The resource mapping configuration of each resource may include a density configuration and an RB offset configuration. For example, a resource mapping configuration may include a density of 0.5, an odd/even RB; a density of ⅓, an RB offset of 0, 1, 2; a density of ¼, an RB offset of 0, 1, 2, 3. The example 600 of FIG. 6 includes two resources (e.g., Resource 0 602 and Resource 1 604), having a density of ½, and an RB offset of 0, 1 for resource 0 and resource 1, respectively. The example 700 of FIG. 7 includes three resources (e.g., Resource 0 702, Resource 1 704, and Resource 2 706), having a density of ½, and an RB offset of 0, 1 and 0 for resource 0, resource 1, and resource 2, respectively.

The UE may select M out of Ks resources via CSI-RS resource indicator (CRI) if Ks>M. If Ks=M, then each resource may be transmitted on a different set of RBs and there is no need for a CRI. If Ks>M, then some resources may be transmitted on the same set of RBs. The UE may select M resources where any of the M resources are transmitted on a different set of RBs. In some aspects, the UE may freely select M resources out of Ks resources, indicating that within the selected M resources, there may exist two resources that are transmitted on same set of RBs. M may be configured via RRC in the CSI reporting configuration. M may be determined based on the CSI-RS density configuration. For instance, if density d, then M=1/d. Port selection may be free-selection of the ports within the selected M resources.

In some aspects, a port index remapping may be based on the order resource index indicated via CRI. A codepoint of CRI may indicate a resource indices combination (e.g., $\{k_1, k_2, \ldots k_M\}$. The indices may be ordered in an increasing order. The ports of the m-th (m={0, 1, . . . , M−1}) selected resource (e.g., resource index km) may be re-indexed as 3000+m·P, 3000+m·P+1, . . . , 3000+m·P+P−1. In some aspects, all resources (i.e., M=Ks) are used to generate one CSI (including at least PMI) collectively. In this case, there may not be a CRI indication from UE to BS. The indices of CSI-RS ports will be reindexed follow an order firstly across the CSI-RS ports within one resource, and secondly across different CSI-RS resources. The virtual PDSCH assumption used for CQI calculation may be expressed as follows:

$$\begin{bmatrix} y^{(3000)} \\ \vdots \\ y^{(3000+P-1)} \\ y^{(3000+P)} \\ \vdots \\ y^{(3000+2P-1)} \\ \vdots \\ y^{(3000)+(M-1)\cdot P)} \\ \vdots \\ y^{(3000+(M-1)\cdot P+P-1)} \end{bmatrix} = W \begin{bmatrix} x^{(0)} \\ \vdots \\ x^{(\nu-1)} \end{bmatrix}$$

In some cases, within each resource, the first half of the CSI-RS ports are transmitted through a first polarization, while the second half the CSI-RS ports are transmitted through a second polarization. The indices of CSI-RS ports may be reindexed following an order firstly across the first half of ports within a first resource, secondly across the first half of ports of a second CSI-RS resources, thirdly across the second half of ports within the first resource and fourthly across the second half of ports within the second resource. Specifically, for a p-th port in m-th resource (p={0, 1, . . . P−1, etc} and m={0, 1, . . . M−1} if there is CRI reporting and M<Ks, or m={0, 1, . . . , Ks−1} if there is no CRI reporting and all resources are used collectively to generate one PMI), it is reindexed as 3000+P/2*m+p if p<=P/2−1 or reindexed as 3000+P/2*M+P/2*m+p−P/2 if P/2<=p<=P−1.

Figure 8:
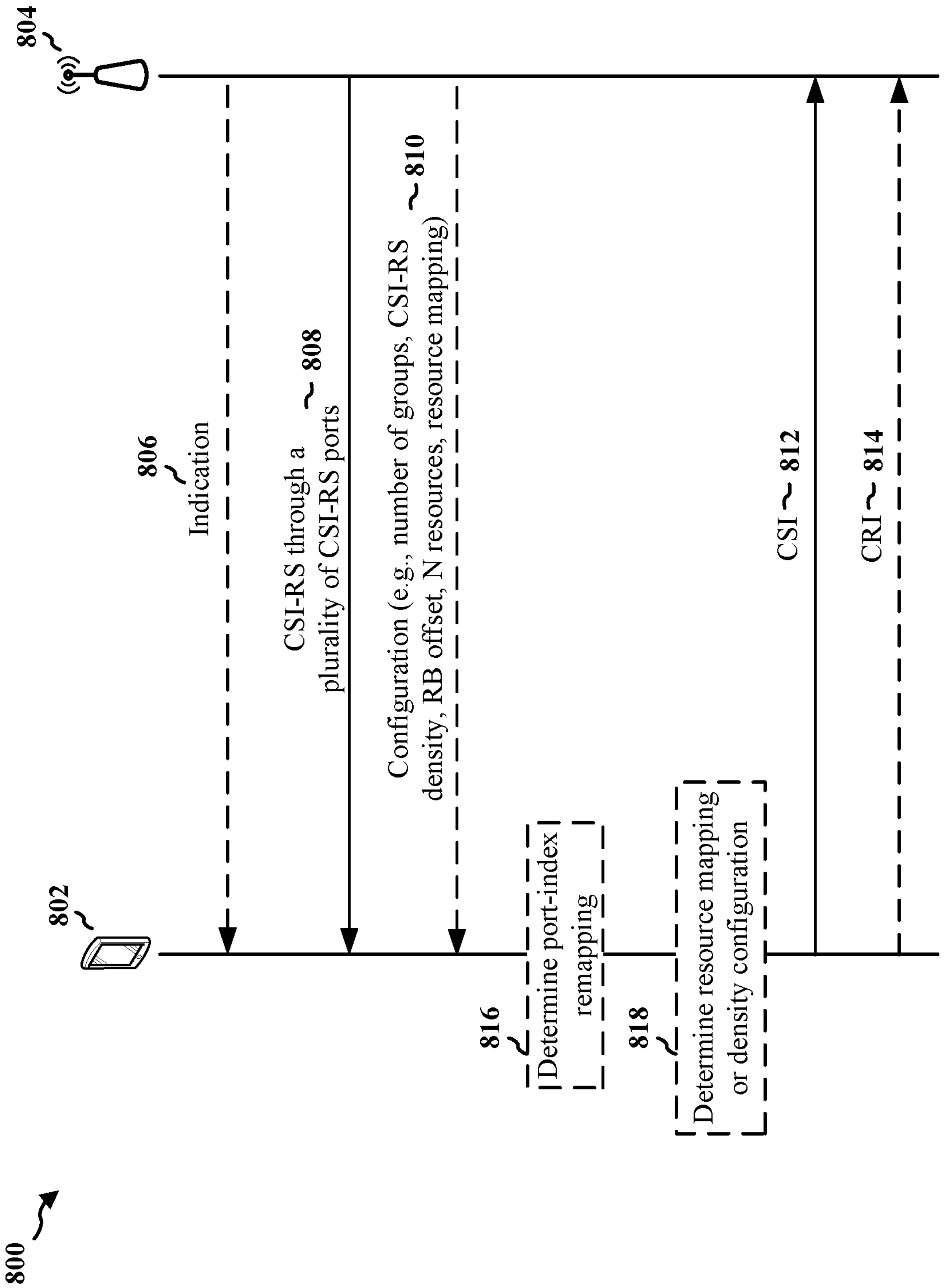
FIG. 8 illustrates an example communication flow between a UE and a base station.

FIG. 8 is a call flow diagram 800 of signaling between a UE 802 and a base station 804. The base station 804 may be configured to provide a cell. The UE 802 may be configured to communicate with the base station 804. For example, in the context of FIG. 1, the base station 804 may correspond to base station 102/180 and, accordingly, the cell may include a geographic coverage area 110 in which communication coverage is provided and/or small cell 102' having a coverage area 110'. Further, a UE 802 may correspond to at least UE 104. In another example, in the context of FIG. 3, the base station 804 may correspond to base station 310 and the UE 802 may correspond to UE 350. Optional aspects are illustrated with a dashed line.

In some aspects, for example as illustrated at 806, the base station 804 may transmit an indication to the UE 802. The UE 802 may receive the indication. The indication may indicate that the CSI-RS ports within a resource are divided in groups and each group is transmitted on different sets of RBs.

As illustrated at 808, the base station 804 may transmit CSI-RS through a plurality of ports. Different CSI-RS ports of the plurality of CSI-RS ports may be transmitted on a different set of RBs. The UE 802 may receive the CSI-RS through the plurality of CSI-RS ports. In some aspects, the UE 802 may receive the CSI-RS based on the indication received from the base station 804. In some aspects, the plurality of CSI-RS ports may include N ports. The N ports may be divided into M groups, with $N_i$ ports in an i group of the M groups. In some aspects, the CSI-RS ports for each group may be transmitted on a corresponding set of RBs, such that the plurality of CSI-RS ports may be within one CSI-RS resource, and the M groups may be within the one CSI-RS. The CSI-RS ports for each group may be transmitted on different sets of RBs. In some aspects, the $N_i$ ports in the i group may be transmitted on every M RB within a set of RBs starting at RB i−1. In some aspects, the N ports may be divided evenly into the M groups, where $N_i=N_{i+1}$ for each i=1, 2, . . . , M−1. The N ports may be mapped sequentially into each group of the M groups. In some aspects, the plurality of CSI-RS ports may be within a plurality of CSI-RS resources Ks, wherein the CSI-RS ports within each resource may be transmitted on a corresponding set of RBs. The set of RBs on which the CSI-RS ports are transmitted may be different for different resources. In some aspects, the CSI-RS ports on each M selected resource may be transmitted on a different set of RBs. In some aspects, the value of M may be configured via RRC signaling. In some aspects, the value of M may be determined by a CSI-RS density.

In some aspects, as illustrated at 810, the base station 804 may transmit configuration information to the UE 802. The UE 802 may receive the configuration information from the base station 804. In some aspects, the configuration information may indicate a number of groups M. In some aspects, the configuration information may indicate a CSI-RS density. The number of groups M may be based on the CSI-RS density. In some aspects, the configuration information may indicate an RB offset and CSI-RS density. The configuration information may indicate the RB offset and the CSI-RS density in association with each CSI-RS resource of the plurality of CSI-RS resources Ks. In some aspects, the UE 802 may receive a CSI-RS resource set configuration wherein the resource set comprises Ks resources and a CSI report configuration. An association between a resource set and the CSI report configuration may be determined. In some aspects, the UE may receive the Ks resources via RRC signaling of NZP-CSI-RS-ResourceSet. The UE may receive a RRC signaling, CSI-AssociatedReportConfigInfo, to determine the association of a resource set to a CSI report configuration. UE may determine Ks CSI-RS resources within the resource set. In some aspects, each CSI-RS resource may comprise a plurality of parameters. In some aspects, one parameter of the plurality of parameters for different resources within the Ks resources may be different for each of the different resources. For example, in some aspects, the one parameter may comprise an RB comb. In such aspects, each of the different resources within the N resources may have a different RB comb. In some aspects, the UE may not expect a different resource to have more than one configuration of different RE location, CDM type, symbol location, slot location, different density values, or frequency bandwidth. The network may configure the resources with the same RE location, same symbol location, same CDM type, same slot location, and the same density values. In some instances, there may be many parameters for a resource, such as but not limited to, RE location, CDM type, symbol location, slot location, or density. In some aspects, one of these parameters may be different across the multiple resources. In some aspects, aggregated resources on a same RB comb may have a different RE location or a different symbol location, but the aggregated resources on different RB-comb may have the same RE location, same CDM type, same symbol location, same slot location (if CSI-RS is periodic or semi-persistent). In some aspects, some resources may be on the same RB-comb while some are on different RB-comb. In instances where resources are on the same RB-comb, the resources may be different by RE or symbol location. In instances where resources are on different RB-comb, the resources may differ by RB-comb configuration. Aggregated resources on a first RB-comb should have the same RE location, symbol location, CDM type as aggregated resources on a second RB-comb. In some aspects, the aggregated resources of the N resources may be on a different RB comb and may have the same RE location, the same symbol location, and/or the same CDM type.

In some aspects, the UE 802 may receive a configuration of a first resource and one or more additional configuration. The configuration of the first resource may comprise a full resource mapping configuration. The full resource mapping configuration includes RE location, symbol location, CDM type, density, RB-comb, etc. Each additional configuration may be associated with each of the additional resources. In some aspects, the additional configuration may comprise RE positions within a resource block for the additional resource. For example, other configuration such as symbol location, density, CDM type, density, RB-comb and a number of ports may follow the configuration in the first resource mapping configuration. In some aspects, the additional configuration may comprise symbol positions within a slot for the additional resource. For example, other configurations such as RE position, density, CDM type, density, RB-comb and a number of ports may follow the configuration in the first resource mapping configuration. In some aspects, the additional configuration comprises a density configuration for the additional resource. In some aspects, other configurations such as RE position, symbol location, CDM type, and a number of ports may follow the configuration in the first resource mapping configuration. In some aspects, the UE 802 may receive a configuration of a first CSI-RS resource and a number of resources Ks.

In some aspects, for example as illustrated at 818, the UE 802 may determine a resource mapping configuration for an additional resource. The UE may determine the resource mapping configuration for the additional resource based at least on the full resource mapping configuration and the additional configuration. In some aspects, the UE 802 may determine a density configuration or an RB comb for each of the resources Ks. The UE may determine the density configuration or the RB comb for each of the resources Ks based on a value of Ks and a density configuration and an RB comb configured for the first CSI-RS resource. For example, if the density is 0.5 and an even RB in the first resource configuration with a Ks value=2, then the second resource is on an add RB. In some aspects, if the density is 0.25 and the RB-comb1 is in the first resource configuration and a Ks value=2, then the second resource may be on RB-comb3. In some aspects, if density is 0.25 and RB-comb1 in the first resource mapping configuration and Ks value=4, then the second resource is on RB-comb2, the third resource is RB-comb3, and the fourth resource is on RB-comb4. More generally, if density=d (e.g., total number of RB combs=1/d) and if RB-combX is configured in the first resource mapping configuration, then the kth resource mapping (k=1, . . . , Ks) is on the RB-combY, where Y=mod (X+(1/d)/Ks*k−1, 1/d)+1. Other configurations, e.g., RE location, symbol location, cdm type, slot offset, periodicity, etc. follow the same configuration as in the first resource configuration. In some aspects, the value of Ks may be configured in the CDI report of a parameter of codebook configuration.

As illustrated at 812, the UE 802 may report at least one CSI. The UE 802 may report the at least one CSI based on a CSI-RS pattern. The base station 804 may receive the at least one CSI report from the UE based on the transmitted CSI-RS. In some aspects, the UE 802 may transmit the CSI calculated via all ports in multiple CSI-RS resources. In some aspects, the number of multiple CSI-RS resources M may be equal to the total number of CSI-RS resources. In some aspects, the number of multiple CSI-RS resources M may be less than the total number of CSI-RS resources. In some aspects, the CSI may comprise at least one of a precoding matrix indicator (PMI), a rank indicator (RI), or a channel quality indicator (CQI).

In some aspects, for example as illustrated at 814, the UE 802 may transmit a CSI-RS resource indicator (CRI). The UE 802 may transmit the CRI to the base station 804. The base station 804 may receive the CRI. The CRI may indicate a selection of the M resource out of the Ks resources if Ks>M. In some aspects, some resources are grouped together for one CSI measurement. For instance, every M resources are grouped, and there are Ks/M candidate groups, then the CRI may indicate a selection of a group out of Ks/M candidate groups. In some aspects, if all Ks resources are used collectively for a CSI measurement, then there is no CRI reporting from UE to BS.

In some aspects, for example as illustrated at 816, the UE 802 may determine a port-index mapping for each port in the selected M resource. The UE 802 may determine the port-index mapping based on a resource index and a local index in the selected M resource. In some aspects, a channel quality indicator (CQI) may be calculated by mapping the PMI to the CSI-RS ports after the port-index remapping. The reported CSI may be based on the index mapping. The PMI may be mapped to ports with the remapping. The CQI may be calculated using the PMI and based on the remapping.

Figure 13:
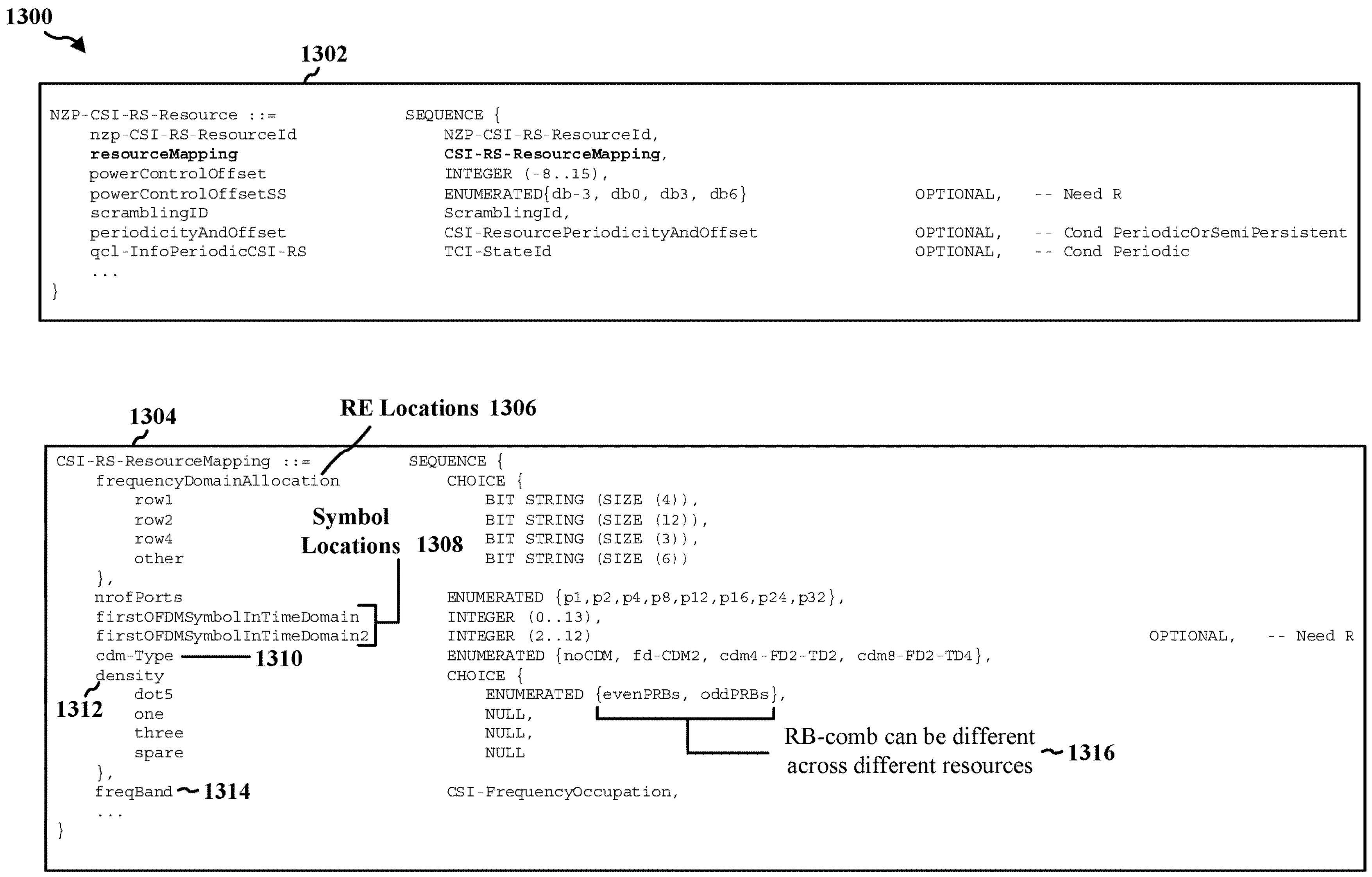
FIG. 13 is a diagram illustrating an example of a message format.
Figure 14:
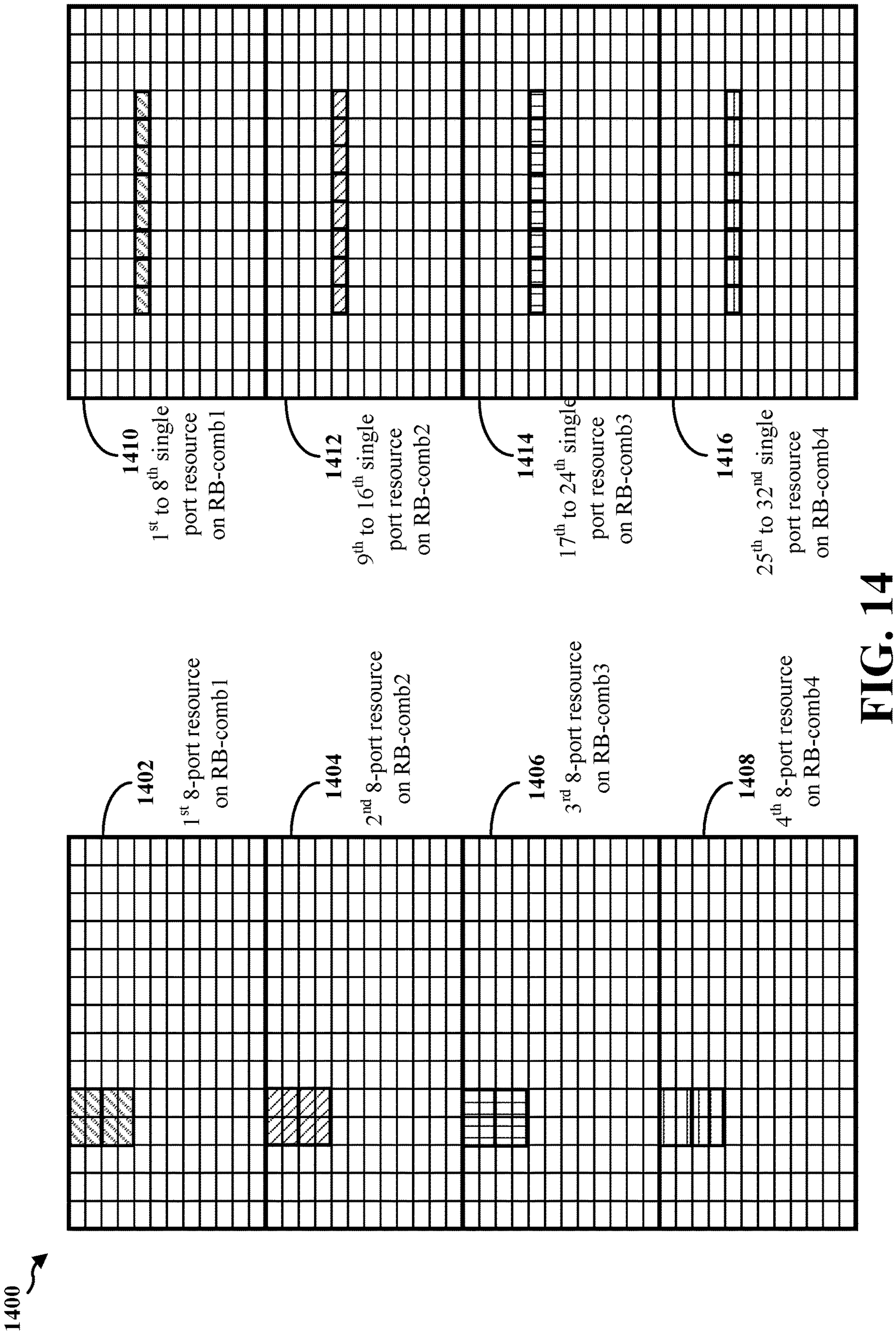
FIG. 14 is a diagram illustrating an example of a transmission of a plurality of CSI-RS ports.

In some aspects, for example as illustrated at 818, the UE 802 may determine a resource mapping or density configuration. In some aspects, the plurality of CSI-RS ports may be within a plurality of CSI-RS resources Ks. In such aspects, the CSI-RS ports within each resource may be transmitted on a corresponding set of RBs. In some aspects, the UE may receive a CSI report configuration, and a configuration of one or more resource set wherein each resource may comprise one or more CSI-RS resources. An association of a resource set from the CSI-RS resource to the CSI report configuration may be determined. For example, the UE may receive a non-zero power (NZP) CSI-RS resource set (e.g., NZP-CSI-RS ResourceSet) set comprising Ks resources via RRC signaling and/or receive a configuration for CSI-RS resource set and CSI report configuration association (e.g., CSI-AssociatedReportConfigInfo) to determine the association of a resource set to a CSI report configuration. The UE may determine the association of the resource set from the CSI-RS resource to the CSI report configuration. In some aspects, each CSI-RS resource within the CSI-RS resource set may comprise a plurality of parameters. In some aspects, one parameter of the plurality of parameters for different resources within the Ks resources may be different for each of the different resources. For example, in some aspects, the one parameter may comprise an RB comb. In such aspects, each of the different resources within the Ks resources may have a different RB comb. In some aspects, for example a port selection code book with multiple resources (where the UE may calculate one CSI using multiple resources collectively), the UE may not expect different resources to have more than one configuration of a different RE location, CDM type, symbol location, slot location (e.g., slot offset and periodicity if periodic/semi-persistent resource), different density values, or frequency bandwidth. In other words, the UE may not expect different resources to have different configurations, other than the RB comb. The resources may be configured by the network with the same RE location, same symbol location, same CDM type, same slot location (e.g., same slot offset and periodicity if periodic/semi-persistent resource), and same density values. For example, with reference to example 1400 of FIG. 14, resources 1402, 1404, 1406, 1408 are in different RB combs, while the other parameters are the same. If these resources, other than the RB comb, are configured with different configurations, then the configuration may be an error case. There are many parameters for a resource, such as but not limited to RE location, CDM type, symbol location, slot location, and/or density. However, the parameters should be configured such that one of these parameters may be different across the multiple resources. In some aspects, aggregated resources on a same RB comb may have a different RE location or a different symbol location. In some aspects, the aggregated resources on a different RB comb may have the same RE location, the same symbol location, same slot location (e.g., same slot offset and periodicity if periodic/semi-persistent resource) and/or the same code division multiplexing (CDM) type. In some aspects, some resources may be on the same RB comb, while some are on a different RB comb. In instances where resources are on the same RB comb, the resources may differ by RE or symbol location. In instances where resources are on a different RB comb, the resources may differ by RB comb configuration. For example, the aggregated resources on a first RB comb (e.g., RB comb1) may have the same RE location, symbol location, CDM type as aggregated resources on a second RB comb (e.g., RB comb2). For example, with reference to example 1400 of FIG. 14, there are a total of 32 single-port resources, aggregated resources 1410 (formed by resources 1-8), 1412 (formed by resources 9-16), 1414 (formed by resources 17-24), 1416 (formed by resources 25-32) are on different RB combs and have the same RE location, symbol location, and CDM type. For the resources on the same RB-comb, e.g., aggregated resource 1410 (formed by resources 1-8) on RB-comb1, each resource in the aggregated resource may have a particular symbol location, and the symbol location across different resources in the same RB-comb may be different. The UE may not expect to have more than a predefined number of ports (e.g., 32 ports) across all the resources. The network may configure the resources such that the total number of ports across all the resources do not exceed the predefined number of ports. With reference to the example 1300 of FIG. 13, an RRC signaling structure 1302 of a non-zero power (NZP) CSI-RS resource may include a resource mapping. The resource mapping 1304 may identify parameters, such as but not limited to, RE locations 1306, symbol locations 1308, CDM type 1310, density 1312, frequency band 1314, and RB comb 1316.

Figure 16:
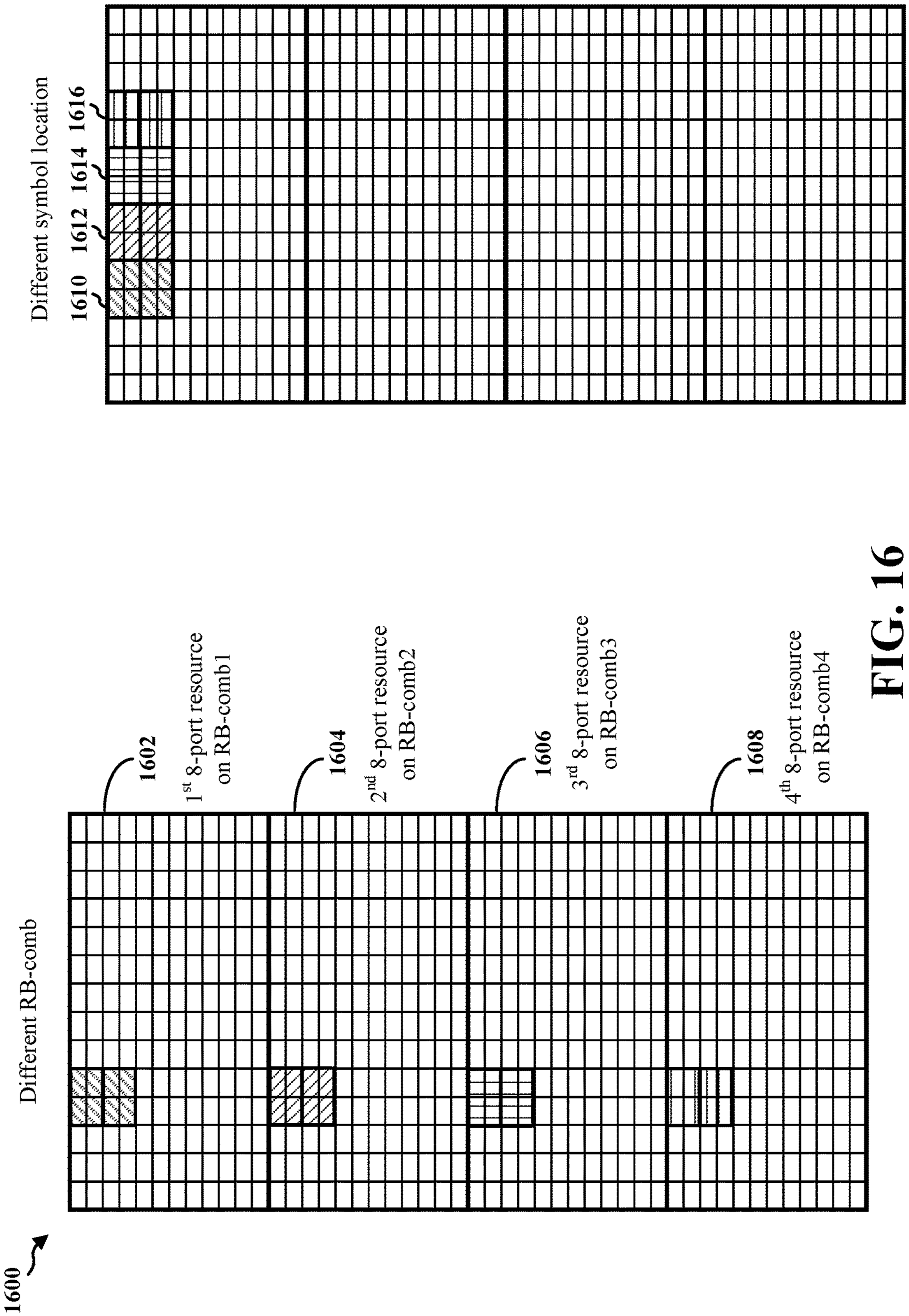
FIG. 16 is a diagram illustrating an example of a transmission of a plurality of CSI-RS ports.

In some aspects, the UE may receive a configuration of a first resource and one or more additional configurations. The configuration of the first resource may comprise a full resource mapping configuration. With reference to diagram 1500 of FIG. 15, the NZP-CSI-RS resource 1502 may include one or more additional configurations 1504. In some aspects, the one or more additional configurations 1504 may comprise RE positions 1508 within a resource block for the additional resource. The one or more additional configurations, such as symbol location, density, CDM type, and number of ports may be similar to the full resource mapping configuration of the first resource. In some aspects, the one or more additional configurations 1504 may comprise symbol positions 1510 within a slot for the additional resource. The one or more additional configurations, such as RE position, density, CDM type, and number of ports may be similar to the full resource mapping configuration of the first resource. With reference to the diagram 1600 of FIG. 16, the symbol location for resources 1610, 1612, 1614, 1616 may be determined based on the one or more additional configurations (e.g., symbol configuration 1510), while the remaining parameters are based on the full resource mapping configuration of the first resource. In some aspects, the one or more additional configurations 1504 may comprise a density configuration and/or RB comb configuration 1506 for the additional resource. The one or more additional configurations, such as RE position, symbol location, CDM type, and number of ports may be similar to the full resource mapping configuration of the first resource. With reference to the diagram 1600 of FIG. 16, the RB comb for resources 1602, 1604, 1606, 1608 may be determined based on the one or more additional configurations (e.g., RB comb configuration 1506), while the remaining parameters are based on the full resource mapping configuration of the first resource.

In some aspects, the UE may determine a resource mapping configuration for an additional resource. The UE may determine the resource mapping configuration for the additional resource based at least on the full resource mapping configuration and the one or more additional configurations.

In some aspects, the UE may receive a configuration of a first CSI-RS resource and a configuration comprising and an additional configuration comprising a number of resources Ks. In some aspects, the additional configuration may further comprise at least one of an RE location, a symbol location, a CDM type, a slot offset, a periodicity. In some aspects, the additional configuration may follow the same configuration as the configuration for the first CSI-RS resource. In some aspects, the number of Ks may be configured in a CSI report configuration or a parameter of a codebook configuration.

In some aspects, the UE may determine a density configuration or an RB comb for each of the resources Ks. The UE may determine the density configuration or the RB comb for each of the resources Ks based on a value of Ks and a density configuration and an RB comb configured for the first CSI-RS resource. For example, if the density is 0.5 and the first resource configuration is in the even RB and the Ks value is 2, then the second resource is within the odd RB. In some aspects, if the density is 0.25 and the first resource configuration is in a first RB comb and the Ks value is 2, then the second resource is in a third RB comb. In some aspects, if the density is 0.25 and the first resource configuration is in a first RB comb and the Ks value is 4, then the second resource is in a second RB comb, the third resource is in a third RB comb, and the fourth resource is in a fourth RB comb. In some aspects, if density=d (e.g., total number of RB combs=1/d) and if RB combX is configured in the first resource mapping configuration, then the k-th resource mapping (e.g., k=1, . . . , Ks) is in the RB combY, where Y is defined by the following equation:

$$Y = \mathrm{mod}\left(X + \left(\frac{\frac{1}{d}}{K_s}\right) \times (k-1) - 1, \frac{1}{d}\right) + 1$$

Here, k={1, 2, 3, 4}, X={1, 2, 3, 4} and Y={1, 2, 3, 4}. Other configurations, such as but not limited to RE location, symbol location, CDM type, slot offset, periodicity, etc., may follow the same configuration as in the first resource configuration. The value Ks may be configured in the CSI report configuration or as a parameter of a codebook configuration.

In some aspects, the CSI report configuration may comprise a configuration for a CSI interference measurement (IM) (CSI-IM) associated with multiple channel measurement resources. The number of CSI-IM resources may be equal to the number of channel measurement resources (CMR). In some aspects, there may be a one-to-one mapping between the CSI-IM and CMR. For a CSI report configuration, the UE may measure a CSI using {CMR1, CSI-IM1} and another CSI using {CMR2, CSI-IM2} and determine the best of the two. A port selection codebook with multiple resource channel measurement generating one CSI, the mapping between CSI-IM and CMR may be revised to ensure that interference is accurately measured, and not measured multiple times, since the CMRs may be used collectively to generate a CSI measurement. In some aspects, if the CSI report configuration comprises Ks channel measurement resources used to generate a single CSI collectively, there may be one CSI-IM resource for interference measurement, and the Ks CMR resources may be associated to the single CSI-IM for CSI measurement. In some aspects, the CSI report configuration may comprise Ks channel measurement resources used to generate a single CSI associated with Ks common CSI-IM resources. In some aspects, the plurality of CSI-RS resources Ks which may be used to calculate one CSI collectively count a single CSI processing unit (CPU). In some aspects, the plurality of CSI-RS resources Ks which may be used to calculate one CSI collectively count one active CSI-RS resource. The one active resource may comprise Ks*P active ports, where P is a number of ports per CSI-RS resource Ks. When the UE reports CSI-RS capability as a triplet of {P, K, N}, the report indicates that if the network schedules or configures a CSI report configuration associated to P ports across all channel measurement resources, the UE may process at most K CSI reports, and N ports in total simultaneously.

In the context of a CSI report with multiple CSI-RS resources for channel measurement used to generate one CSI collectively, in some aspects, the UE may report CSI-RS capability as a list of {A, B, C}, where A is the number of active ports per resource (concurrently), B is the number of active resources (concurrently), and C is the number of total active ports (concurrently). In instances where the network performs CSI report configuration of CSI request, the network should respect the CSI-RS capability, reported by the UE, such that the number of active ports per active report P*Ks is less than or equal to A (e.g., for FDD CSI where Ks resources are used to generate one CSI), and a total number of CSI active reports is less than or equal to B, and total number of active ports is less than or equal to C. In some aspects, the UE may report CSI-RS capability as a list of {A, B, C}, where A is the number of active ports per active report (concurrently), B is the number of active reports (concurrently) and C is the number of total active ports (concurrently). In instances where the network performs CSI report configuration of CSI request, network should respect the CSI-RS capability, reported by the UE, such that the number of active ports per active report P*Ks is less than or equal to A (e.g., for FDD CSI where Ks resources are used to generate one CSI), and a total number of CSI active reports less than or equal to B, and total number of active ports is less than or equal to C. In some aspects, the UE may report multiple CSI-RS capabilities as {A1, B1, C1} and {A2, B2, C2}. The UE may report the multiple capabilities in this manner due to the complexity of processing A1 port per resource is different from processing A2 port per resource. For example, the list of capabilities may comprise {A1, B1, C1}={16, 3, 48} and {A2, B2, C2}={32, 1, 32}. In instances where the network performs CSI report configuration or scheduling, if Ks*P is less than or equal to A1, then network should respect B1 and C1. In some aspects, if A1<if Ks*P<A2, network should respect B2 and C2.

In some aspects, for example at 932, the UE may determine the multiplexing of ports in a delay domain. For example, 932 may be performed by determination component 1050 of apparatus 1002. The UE may determine how the ports are multiplexed in the delay domain in order to separate the multiplexed ports. Ports may be multiplexed in an effort to reduce signaling overhead. Each port may be precoded by an SD-FD bases pair. In some aspects, if two ports are transmitted with FD bases, which may be largely separated in delay domain, the network may multiplex them on the same time-frequency resource. In some aspects, the UE may separate the two ports in the delay domain. In some aspects, the two ports may be intended for the same UE or different UEs.

The manner in which the ports are multiplex should be provided to the UE in order for the UE to properly separate the multiplexed ports. In some aspects, the UE may be configured with information regarding the FD precoding of each port. The UE may perform CSI-RS channel estimation based on the information, and measure CSI based on the information. The information, for each port, may comprise a starting point of a tap (or a starting point of a FD basis set) in the delay domain and/or a window size in the delay domain (or a window size of a FD basis set, or the number of consecutive FD bases). For example, the starting point Mini, candidate values may include 0, N3/R, N3/R*2, . . . N3/R*(R−1), where N3 is the number of PMI subbands, R is the number of PMI subbands per CQI subbands, and the starting point may be port-specific or port-group specific, or may be common to all ports. In some aspects, the window size may be common to all ports configured to the UE. In some aspects, the information may include the starting point, while the window size may be preconfigured or derived by the UE. For example, the information may indicate that the starting point is N3/R, such that the window is from N3/R to N3/R*2−1. In some aspects, the UE may report one or more FD bases during the window.

In some aspects, each CSI-RS port may be transmitted with an additional cover code, e.g., $\alpha^{(p)}(n)=e^{j2\pi\theta n}\cdot w_t\cdot w_f\cdot r(n)$, as the transmitted signal on port p on RE n, where $w_t$ and $w_f$ are the current cover code in the time and frequency domain, while r(n) is the pilot. For example, a candidate value of θ:

$$\frac{\delta}{N_3\cdot N_{RB}^{PMI-sB}\cdot N_{RB}^{RE}} \text{ and}$$

$$\delta=\frac{N_3}{R},\ \frac{N_3}{R}*2,\ \ldots\ \frac{N_3}{R}*(R-1), \text{ or}$$

$$\frac{\delta}{N_{RB}^{CSI-RS}\cdot N_{RB}^{RE}} \text{ and}$$

$$\delta=\frac{N_{RB}^{CSI}}{K},\ \frac{N_{RB}^{CSI}}{K}*2,\ \ldots\ \frac{N_{RB}^{CSI}}{K}*(K-1),$$

where $$N_{RB}^{PMI-SB}$$

is the number of RBs per PMI subband, $$N_{RB}^{RE}$$

is the number of REs per RB, $$N_{RB}^{CSI}$$

is the number of RBs in the CSI-RS beamwidth.

Figure 9:
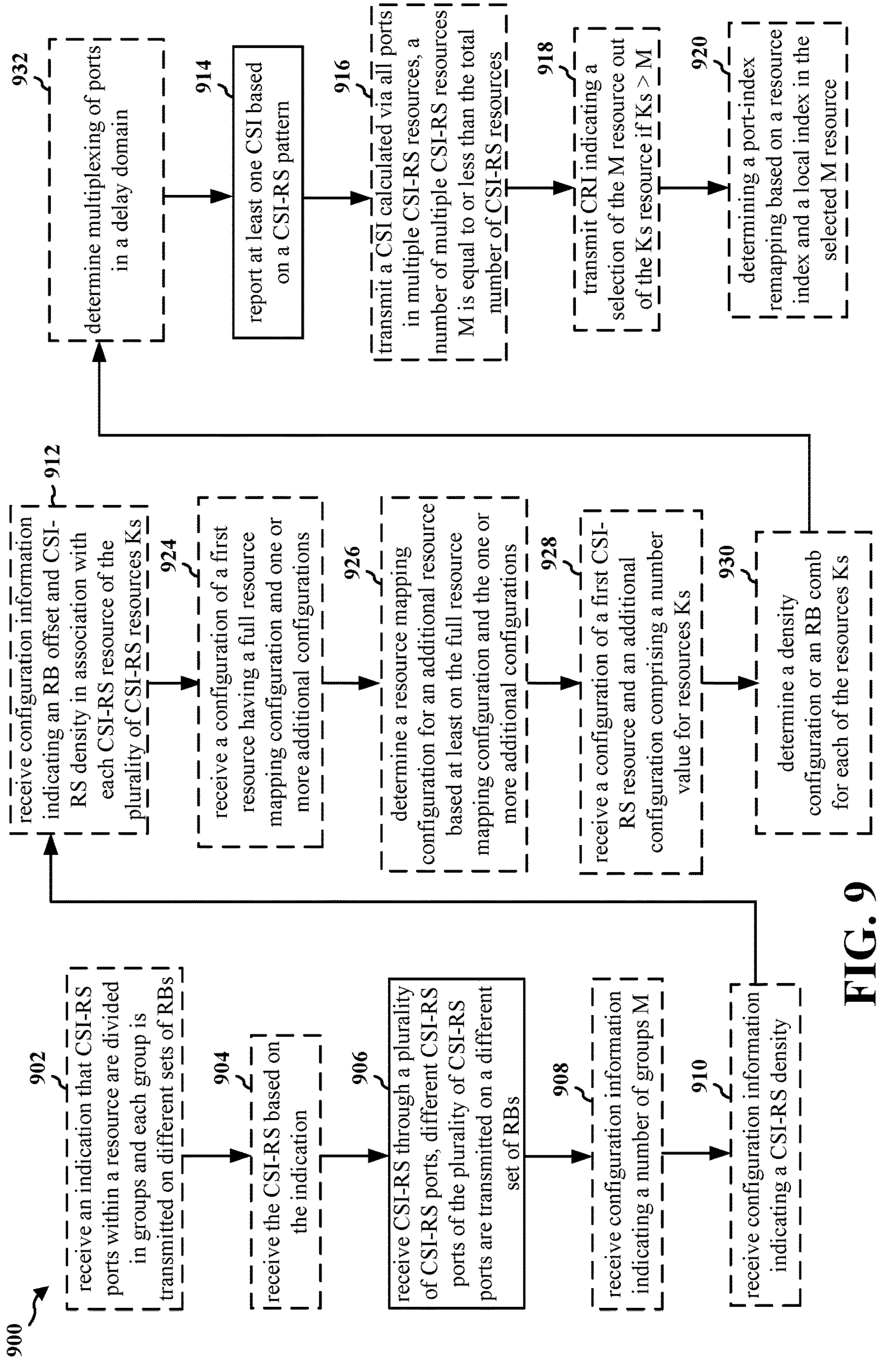
FIG. 9 is a flowchart of a method of wireless communication.

FIG. 9 is a flowchart 900 of a method of wireless communication. The method may be performed by a UE or a component of a UE (e.g., the UE 104, 802; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may configure a UE to receive a plurality of CSI-RS ports where different ports may be transmitted on different sets of RBs within the frequency band of the CSI-RS.

In some aspects, for example at 902, the UE may receive an indication from the base station. For example, 902 may be performed by indication component 1040 of apparatus 1002. The indication may indicate that CSI-RS ports within a resource are divided in groups. Each group may be transmitted on different sets of RBs.

In some aspects, for example at 904, the UE may receive a CSI-RS. For example, 904 may be performed by CSI-RS component 1042 of apparatus 1002. The UE may receive the CSI-RS based on the indication from the base station.

At 906, the UE may receive the CSI-RS through a plurality of CSI-RS ports. For example, 906 may be performed by CSI-RS component 1042 of apparatus 1002. The different CSI-RS ports of the plurality of CSI-RS ports may be transmitted on a different set of resource blocks (RBs). In some aspects, the plurality of CSI-RS ports may include N ports. The N ports may be divided into M groups, with $N_i$ ports in an i group of the M groups. The CSI-RS ports for each group may be transmitted on a corresponding set of RBs. The plurality of CSI-RS ports may be within one CSI-RS resource, and the M groups may be within the one CSI-RS. The CSI-RS ports for each group may be transmitted on a different sets of RBs. In some aspects, the $N_i$ ports in the i group may be transmitted on every M RB within a set of RBs starting at RB i−1. In some aspects, the N ports may be divided evenly into the M groups, where $N_i=N_{i+1}$ for each i=1, 2, . . . , M−1. The N ports may be mapped sequentially into each group of the M groups. In some aspects, the plurality of CSI-RS ports may be within a plurality of CSI-RS resources Ks, such that the CSI-RS ports within each resource may be transmitted on a corresponding set of RBs. In some aspects, the set of RBs on which the CSI-RS ports are transmitted may be different for different resources. In some aspects, the CSI-RS ports on each M selected resource may be transmitted on a different set of RBs. In some aspects, the value of M may be configured via radio resource control (RRC) signaling. In some aspects, the value of M may be determined by a CSI-RS density.

In some aspects, for example at 908, the UE may receive a configuration information. For example, 908 may be performed by configuration component 1044 of apparatus 1002. The configuration information may indicate a number of groups M.

In some aspects, for example at 910, the UE may receive a configuration information indicating a CSI-RS density. For example, 910 may be performed by configuration component 1044 of apparatus 1002. The number of groups M may be based on the CSI-RS density.

In some aspects, for example at 912, the UE may receive configuration information indicating an RB offset and CSI-RS density. For example, 912 may be performed by configuration component 1044 of apparatus 1002. The configuration information may indicate the RB offset and the CSI-RS density in association with each CSI-RS resource of the plurality of CSI-RS resources Ks.

In some aspects, the plurality of CSI-RS ports may be within a plurality of CSI-RS resources Ks. In such aspects, the CSI-RS ports within each resource may be transmitted on a corresponding set of RBs. In some aspects, the UE may receive a CSI report configuration and a configuration of one or more resource set, wherein each resource may comprise one or more CSI-RS resources. An association of a resource set from the CSI-RS resource to the CSI report configuration may be determined. For example, the UE may receive an NZP-CSI-RS resource set (e.g., NZP-CSI-RS Resource set) set comprising Ks resources via RRC signaling and/or receive a configuration for CSI-RS resource set and CSI report configuration association (e.g., CSI-AssociatedReportConfigInfo) to determine the association of a resource set to a CSI report configuration. The UE may determine the association of the resource set from the CSI-RS resource to the CSI report configuration. In some aspects, each CSI-RS resource within the CSI-RS resource set may comprise a plurality of parameters. In some aspects, one parameter of the plurality of parameters for different resources within the Ks resources may be different for each of the different resources. For example, in some aspects, the one parameter may comprise an RB comb. In such aspects, each of the different resources within the Ks resources may have a different RB comb. In some aspects, for example a port selection code book with multiple resources (where the UE may calculate one CSI using multiple resources collectively), the UE may not expect different resources to have more than one configuration of a different RE location, CDM type, symbol location, slot location (e.g., slot offset and periodicity if periodic/semi-persistent resource), different density values, or frequency bandwidth. In other words, the UE may not expect different resources to have different configurations, other than the RB comb. The resources may be configured by the network with the same RE location, same symbol location, same CDM type, same slot location (e.g., same slot offset and periodicity if periodic/semi-persistent resource), and same density values. For example, with reference to example 1400 of FIG. 14, resources 1402, 1404, 1406, 1408 are in different RB combs, while the other parameters are the same. If these resources, other than the RB comb, are configured with different configurations, then the configuration may be an error case. There are many parameters for a resource, such as but not limited to RE location, CDM type, symbol location, slot location, and/or density. However, the parameters should be configured such that one of these parameters may be different across the multiple resources. In some aspects, aggregated resources on a same RB comb may have a different RE location or a different symbol location. In some aspects, the aggregated resources on a different RB comb may have the same RE location, the same symbol location, same slot location (e.g., same slot offset and periodicity if periodic/semi-persistent resource) and/or the same CDM type. In some aspects, some resources may be on the same RB comb, while some are on a different RB comb. In instances where resources are on the same RB comb, the resources may differ by RE or symbol location. In instances where resources are on a different RB comb, the resources may differ by RB comb configuration. For example, the aggregated resources on a first RB comb (e.g., RB comb1) may have the same RE location, symbol location, CDM type as aggregated resources on a second RB comb (e.g., RB comb2). For example, with reference to example 1400 of FIG. 14, there are a total of 32 single-port resources, aggregated resources 1410 (formed by resources 1-8), 1412 (formed by resources 9-16), 1414 (formed by resources 17-24), 1416 (formed by resources 25-32) are on different RB combs and have the same RE location, symbol location, and CDM type. For the resources on the same RB comb, e.g., aggregated resource 1410 (formed by resources 1-8) on RB comb1, each resource in the aggregated resource may have a particular symbol location, and the symbol location across different resources in the same RB comb may be different. The UE may not expect to have more than a predefined number of ports (e.g., 32 ports) across all the resources. The network may configure the resources such that the total number of ports across all the resources do not exceed the predefined number of ports. With reference to the example 1300 of FIG. 13, an RRC signaling structure 1302 of an NZP-CSI-RS resource may include a resource mapping. The resource mapping 1304 may identify parameters, such as but not limited to, RE locations 1306, symbol locations 1308, CDM type 1310, density 1312, frequency band 1314, and RB comb 1316.

In some aspects, for example at 924, the UE may receive a configuration of a first resource and one or more additional configurations. For example, 924 may be performed by configuration component 1044 of apparatus 1002. The configuration of the first resource may comprise a full resource mapping configuration. With reference to diagram 1500 of FIG. 15, the NZP-CSI-RS resource 1502 may include one or more additional configurations 1504. In some aspects, the one or more additional configurations 1504 may comprise RE positions 1508 within a resource block for the additional resource. The one or more additional configurations, such as symbol location, density, CDM type, and number of ports may be similar to the full resource mapping configuration of the first resource. In some aspects, the one or more additional configurations 1504 may comprise symbol positions 1510 within a slot for the additional resource. The one or more additional configurations, such as RE position, density, CDM type, and number of ports may be similar to the full resource mapping configuration of the first resource. With reference to the diagram 1600 of FIG. 16, the symbol location for resources 1610, 1612, 1614, 1616 may be determined based on the one or more additional configurations (e.g., symbol configuration 1510), while the remaining parameters are based on the full resource mapping configuration of the first resource. In some aspects, the one or more additional configurations 1504 may comprise a density configuration and/or RB comb configuration 1506 for the additional resource. The one or more additional configurations, such as RE position, symbol location, CDM type, and number of ports may be similar to the full resource mapping configuration of the first resource. With reference to the diagram 1600 of FIG. 16, the RB comb for resources 1602, 1604, 1606, 1608 may be determined based on the one or more additional configurations (e.g., RB comb configuration 1506), while the remaining parameters are based on the full resource mapping configuration of the first resource.

In some aspects, for example at 926, the UE may determine a resource mapping configuration for an additional resource. For example, 926 may be performed by determination component 1050 of apparatus 1002. The UE may determine the resource mapping configuration for the additional resource based at least on the full resource mapping configuration and the one or more additional configurations.

In some aspects, for example at 928, the UE may receive a configuration of a first CSI-RS resource and a configuration comprising an additional configuration comprising a number of resources Ks. For example, 928 may be performed by configuration component 1044 of apparatus 1002. In some aspects, the additional configuration may further comprise at least one of an RE location, a symbol location, a CDM type, a slot offset, a periodicity. In some aspects, the additional configuration may follow the same configuration as the configuration for the first CSI-RS resource. In some aspects, the number of Ks may be configured in a CSI report configuration or a parameter of a codebook configuration.

In some aspects, for example at 930, the UE may determine a density configuration or an RB comb for each of the resources Ks. For example, 930 may be performed by determination component 1050 of apparatus 1002. The UE may determine the density configuration or the RB comb for each of the resources Ks based on a value of Ks and a density configuration and an RB comb configured for the first CSI-RS resource. For example, if the density is 0.5 and the first resource configuration is in the even RB and the Ks value is 2, then the second resource is within the odd RB. In some aspects, if the density is 0.25 and the first resource configuration is in a first RB comb and the Ks value is 2, then the second resource is in a third RB comb. In some aspects, if the density is 0.25 and the first resource configuration is in a first RB comb and the Ks value is 4, then the second resource is in a second RB comb, the third resource is in a third RB comb, and the fourth resource is in a fourth RB comb. In some aspects, if density=d (e.g., total number of RB combs=1/d) and if RB combX is configured in the first resource mapping configuration, then the k-th resource mapping (e.g., k=1, . . . , Ks) is in the RB combY, where Y is defined by the following equation:

$$Y = \mathrm{mod}\left(X + \left(\frac{\frac{1}{d}}{K_s}\right) \times (k-1) - 1, \frac{1}{d}\right) + 1$$

Other configurations, such as but not limited to RE location, symbol location, CDM type, slot offset, periodicity, etc., may follow the same configuration as in the first resource configuration. The value Ks may be configured in the CSI report configuration or as a parameter of a codebook configuration.

In some aspects, the CSI report configuration may comprise a configuration for a CSI-IM associated with multiple channel measurement resources. The number of CSI-IM resources may be equal to the number of CMR. In some aspects, there may be a one-to-one mapping between the CSI-IM and CMR. For a CSI report configuration, the UE may measure a CSI using {CMR1, CSI-IM1} and another CSI using {CMR2, CSI-IM2} and determine the best of the two. A port selection codebook with multiple resource channel measurement generating one CSI, the mapping between CSI-IM and CMR may be revised to ensure that interference is accurately measured, and not measured multiple times, since the CMRs may be used collectively to generate a CSI measurement. In some aspects, if the CSI report configuration comprises Ks channel measurement resources used to generate a single CSI collectively, there may be one CSI-IM resource for interference measurement, and the Ks CMR resources may be associated to the single CSI-IM for CSI measurement. In some aspects, the CSI report configuration may comprise Ks channel measurement resources used to generate a single CSI associated with Ks common CSI-IM resources. In some aspects, the plurality of CSI-RS resources Ks which may be used to calculate one CSI collectively count a single CSI processing unit (CPU). In some aspects, the plurality of CSI-RS resources Ks which may be used to calculate one CSI collectively count one active CSI-RS resource. The one active resource may comprise Ks*P active ports, where P is a number of ports per CSI-RS resource Ks. When the UE reports CSI-RS capability as a triplet of {P, K, N}, the report indicates that if the network schedules or configures a CSI report configuration associated to P ports across all channel measurement resources, the UE may process at most K CSI reports, and N ports in total simultaneously.

In the context of a CSI report with multiple CSI-RS resources for channel measurements used to generate one CSI collectively, in some aspects, the UE may report CSI-RS capability as a list of {A, B, C}, where A is the number of active ports per resource (concurrently), B is the number of active resources (concurrently), and C is the number of total active ports (concurrently). In instances where the network performs CSI report configuration of CSI request, the network should respect the CSI-RS capability, reported by the UE, such that the number of active ports per active report P*Ks is less than or equal to A (e.g., for FDD CSI where Ks resources are used to generate one CSI), and a total number of CSI active reports is less than or equal to B, and total number of active ports is less than or equal to C. In some aspects, the UE may report CSI-RS capability as a list of {A, B, C}, where A is the number of active ports per active report (concurrently), B is the number of active reports (concurrently) and C is the number of total active ports (concurrently). In instances where the network performs CSI report configuration of CSI request, network should respect the CSI-RS capability, reported by the UE, such that the number of active ports per active report P*Ks is less than or equal to A (e.g., for FDD CSI where Ks resources are used to generate one CSI), and a total number of CSI active reports less than or equal to B, and total number of active ports is less than or equal to C. In some aspects, the UE may report multiple CSI-RS capabilities as {A1, B1, C1} and {A2, B2, C2}. The UE may report the multiple capabilities in this manner due to the complexity of processing A1 port per resource is different from processing A2 port per resource. For example, the list of capabilities may comprise {A1, B1, C1}={16, 3, 48} and {A2, B2, C2}={32, 1, 32}. In instances where the network performs CSI report configuration or scheduling, if Ks*P is less than or equal to A1, then network should respect B1 and Cl. In some aspects, if A1<if Ks*P<A2, network should respect B2 and C2.

Figure 17:
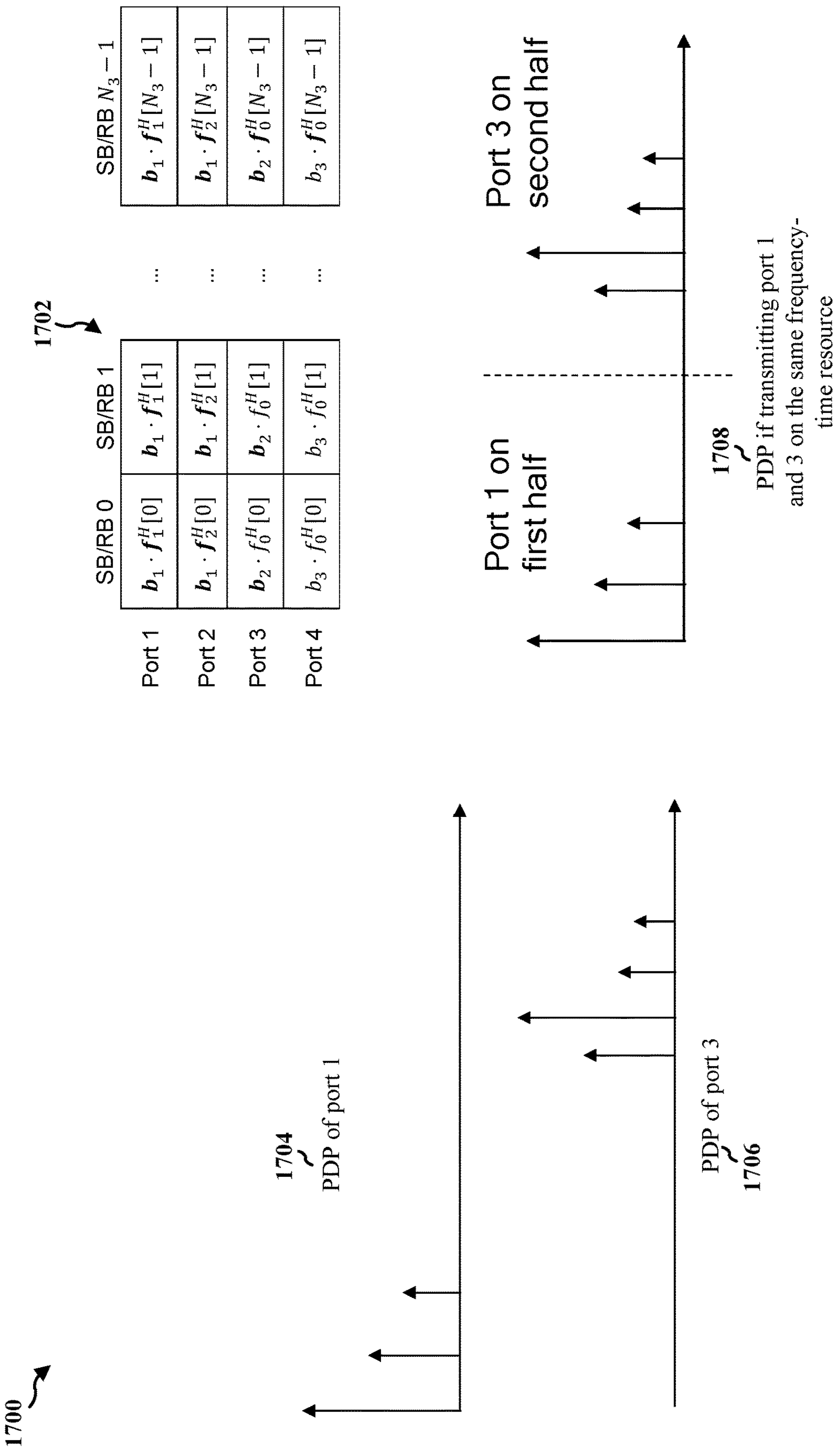
FIG. 17 is a diagram illustrating an example of port multiplexing.

In some aspects, for example at 932, the UE may determine the multiplexing of ports in a delay domain. For example, 932 may be performed by determination component 1050 of apparatus 1002. The UE may determine how the ports are multiplexed in the delay domain in order to separate the multiplexed ports. Ports may be multiplexed in an effort to reduce signaling overhead. Each port may be precoded by an SD-FD bases pair. In some aspects, if two ports are transmitted with FD bases, which may be largely separated in delay domain, the network may multiplex them on the same time-frequency resource. In some aspects, the UE may separate the two ports in the delay domain. In some aspects, the two ports may be intended for the same UE or different UEs. With reference to the diagram 1700 of FIG. 17, the ports (e.g., ports 1-4) may be multiplexed as shown at 1702. Port 1 may include a power delay profile (PDP) 1704, while port 3 may include a PDP 1706. Port 1 and port 3 being multiplexed may result in a PDP 1708, for example if transmitting port 1 and 3 on the same frequency-time resource. In such instances, port 1 may be on the first half, while port 3 may be on the second half.

The manner in which the ports are multiplex should be provided to the UE in order for the UE to properly separate the multiplexed ports. In some aspects, the UE may be configured with information regarding the FD precoding of each port. The UE may perform CSI-RS channel estimation based on the information, and measure CSI based on the information. The information, for each port, may comprise a starting point of a tap (or a starting point of an FD basis set) in the delay domain and/or a window size in the delay domain (or a window size of an FD basis set, or the number of consecutive FD bases). For example, the starting point Mini, candidate values may include 0, N3/R, N3/R*2, . . . N3/R*(R−1), where N3 is the number of PMI subbands, R is the number of PMI subbands per CQI subbands, and the starting point may be port-specific or port-group specific, or may be common to all ports. In some aspects, the window size may be common to all ports configured to the UE. In some aspects, the information may include the starting point, while the window size may be preconfigured or derived by the UE. For example, the information may indicate that the starting point is N3/R, such that the window is from N3/R to N3/R*2−1. In some aspects, the UE may report one or more FD bases during the window.

In some aspects, each CSI-RS port may be transmitted with an additional cover code, e.g., $a^{(p)}(n)=e^{j2\pi\theta n}\cdot w_t\cdot w_f\cdot r(n)$, as the transmitted signal on port p on RE n, where $w_t$ and $w_f$ are the current cover code in the time and frequency domain, while r(n) is the pilot. For example, a candidate value of θ:

$$\frac{\delta}{N_3 \cdot N_{RB}^{PMI-sB} \cdot N_{RB}^{RE}} \text{ and}$$

$$\delta = \frac{N_3}{R}, \frac{N_3}{R} * 2, \ldots \frac{N_3}{R} * (R-1), \text{ or}$$

$$\frac{\delta}{N_{RB}^{CSI-RS} \cdot N_{RB}^{RE}} \text{ and}$$

$$\delta = \frac{N_{RB}^{CSI}}{K}, \frac{N_{RB}^{CSI}}{K} * 2, \ldots \frac{N_{RB}^{CSI}}{K} * (K-1),$$

where $$N_{RB}^{PMI-SB}$$

is the number of RBs per PMI subband, $$N_{RB}^{RE}$$

is the number of REs per RB, $$N_{RB}^{CSI}$$

is the number of RBs in the CSI-RS beamwidth.

At 914, the UE may report at least one CSI. For example, 914 may be performed by CSI component 1046 of apparatus 1002. The UE may report the at least one CSI based on a CSI-RS pattern.

In some aspects, for example at 916, the UE may transmit a CSI. For example, 916 may be performed by CSI component 1046 of apparatus 1002. The UE may transmit the CSI calculated via all ports in multiple CSI-RS resources. In some aspects, the number of multiple CSI-RS resources M may be equal to the total number of CSI-RS resources. In some aspects, the number of multiple CSI-RS resources M may be less than the total number of CSI-RS resources. In some aspects, the CSI may comprise at least one of a precoding matrix indicator (PMI), a rank indicator (RI), or a channel quality indicator (CQI).

In some aspects, for example at 918, the UE may transmit a CSI-RS resource indicator (CRI). For example, 918 may be performed by CRI component 1048 of apparatus 1002. The UE may transmit the CRI to the base station. The CRI may indicate a selection of the M resource out of the Ks resources if Ks>M.

In some aspects, for example at 920, the UE may determine a port-index mapping for each port in the selected M resource. For example, 920 may be performed by determination component 1050 of apparatus 1002. The UE may determine the port-index mapping based on a resource index and a local index in the selected M resource. In some aspects, a channel quality indicator (CQI) may be calculated by mapping the PMI to the CSI-RS ports after the port-index remapping. In some aspects, the UE may reindex the plurality of CSI-RS ports based on a resource index and a port index within the resource. In some aspects, the plurality of CSI-RS ports may be reindexed based on an order. For example, the plurality of CSI-RS ports may be reindexed across ports within one resource, then across ports in different resources. In some aspects, the plurality of CSI-RS ports may be reindexed across a first half of ports within the first resource, then across a first half of ports in a second resource until the last resource if there are more than two resources. In some aspects, the plurality of CSI-RS ports may be reindexed across a second half of ports of the first resource, then across a second half of ports of the second resource, until the last resource if there are more than two resources.

Figure 10:
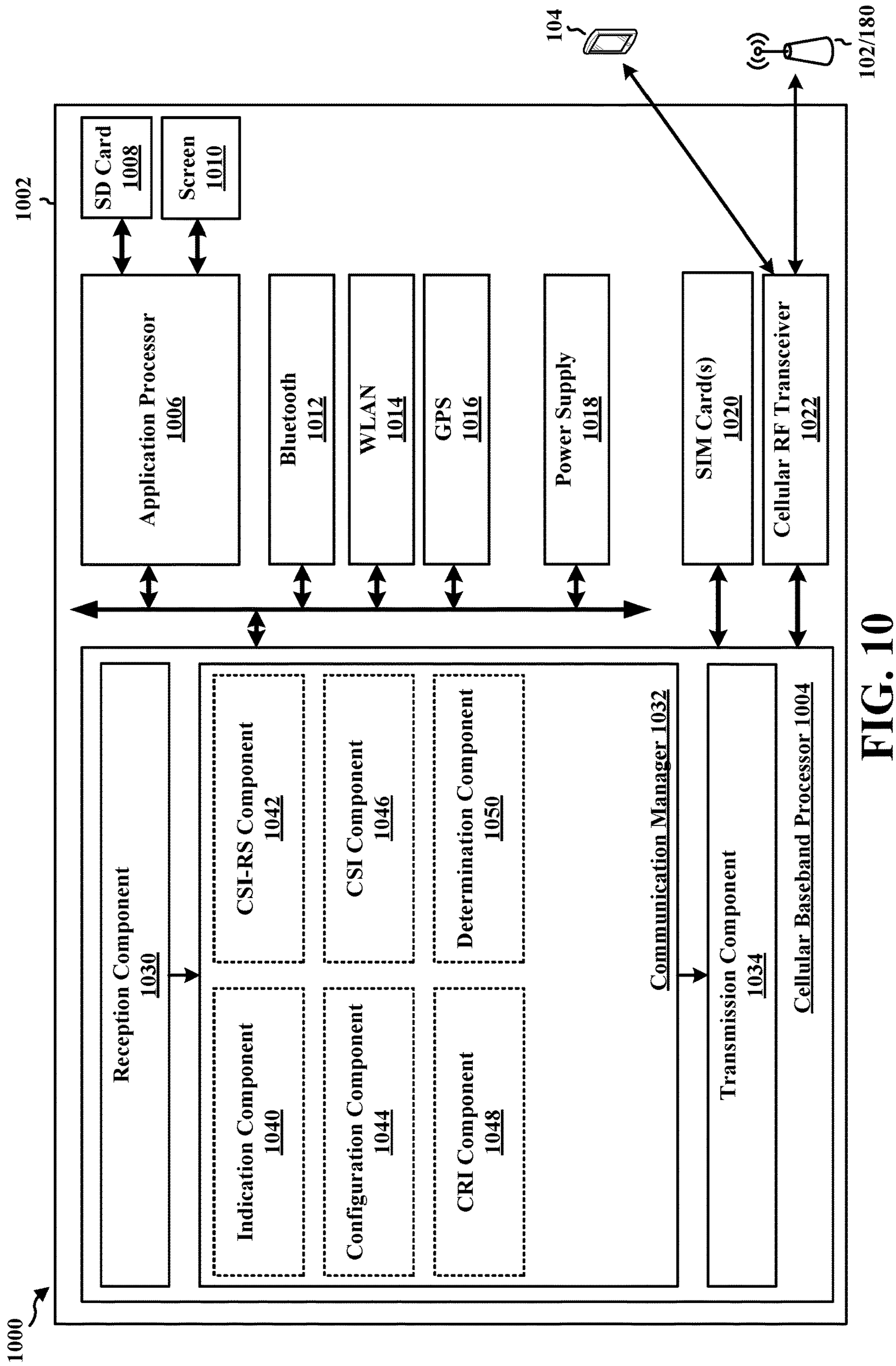
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes an indication component 1040 that is configured to receive an indication from the base station, e.g., as described in connection with 902 of FIG. 9. The communication manager 1032 further includes a CSI-RS component 1042 that is configured to receive a CSI-RS, e.g., as described in connection with 904 of FIG. 9. The CSI-RS component 1042 may be configured to receive the CSI-RS through a plurality of CSI-RS ports, e.g., as described in connection with 906 of FIG. 9. The communication manager 1032 further includes a configuration component 1044 that is configured to receive a configuration information, e.g., as described in connection with 908 of FIG. 9. The configuration component 1044 may be configured to receive a configuration information indicating a CSI-RS density, e.g., as described in connection with 910 of FIG. 9. The configuration component 1044 may be configured to receive configuration information indicating an RB offset and CSI-RS density, e.g., as described in connection with 912 of FIG. 9. The configuration component 1044 may be configured to receive a configuration of a first resource and an additional configuration, e.g., as described in connection with 924 of FIG. 9. The configuration component 1044 may be configured to receive a configuration of a first CSI-RS resource and a number of resources Ks, e.g., as described in connection with 928 of FIG. 9. The communication manager 1032 further includes a CSI component 1046 that is configured to report at least one CSI, e.g., as described in connection with 914 of FIG. 9. The CSI component 1046 may be configured to transmit the CSI calculated via all ports in multiple CSI-RS resources, e.g., as described in connection with 916 of FIG. 9. The communication manager 1032 further includes a CRI component 1048 that is configured to transmit a CRI, e.g., as described in connection with 918 of FIG. 9. The communication manager 1032 further includes a determination component 1050 that is configured to determine a port-index mapping for each port in the selected M resource, e.g., as described in connection with 920 of FIG. 9. The determination component 1050 may be configured to determine a resource mapping configuration for an additional resource, e.g., as described in connection with 926 of FIG. 9. The determination component 1050 may be configured to determine a density configuration or an RB comb for each of the resources Ks, e.g., as described in connection with 930 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving CSI-RS through a plurality of CSI-RS ports. Different CSI-RS ports of the plurality of CSI-RS ports are transmitted on a different set of RBs. The apparatus includes means for reporting at least one CSI based on a CSI-RS pattern. The apparatus further includes means for receiving an indication, from the base station, the indication indicates that the CSI-RS ports within a resource are divided in groups and each group is transmitted on different sets of RBs. The apparatus further includes means for receiving the CSI-RS based on the indication. The apparatus further includes means for receiving configuration information indicating a number of groups M. The apparatus further includes means for receiving configuration information indicating a CSI-RS density, wherein a number of groups M is based on the CSI-RS density. The apparatus further includes means for receiving configuration information indicating an RB offset and CSI-RS density in association with each CSI-RS resource of the plurality of CSI-RS resources Ks. The apparatus further includes means for transmitting a CSI calculated via all ports in multiple CSI-RS resources wherein the number of multiple CSI-RS resources M is equal to or less than the total number of CSI-RS resources, the CSI comprises at least one of a PMI, a RI, or a CQI. The apparatus further includes means for transmitting a CRI indicating a selection of the M resource out of the Ks resource if Ks>M. The apparatus further includes means for determining, for each port in the selected M resource, a port-index remapping based on a resource index and a local index in the selected M resource. The apparatus further includes means for receiving N resources including a CSI-RS resource and a CSI report configuration, wherein an association of a resource set from the CSI-RS resource to the CSI report configuration is determined. The apparatus further includes means for receiving a configuration of a first resource having a full resource mapping configuration and one or more additional configurations. The apparatus further includes means for determining a resource mapping configuration for an additional resource based at least on the full resource mapping configuration and the one or more additional configurations. The apparatus further includes means for receiving a configuration of a first CSI-RS resource and an additional configuration comprising a number of resources Ks. The apparatus further includes means for determining a density configuration or an RB comb for each of the resources Ks based on a value of Ks and a density configuration and an RB comb configured for the first CSI-RS resource. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
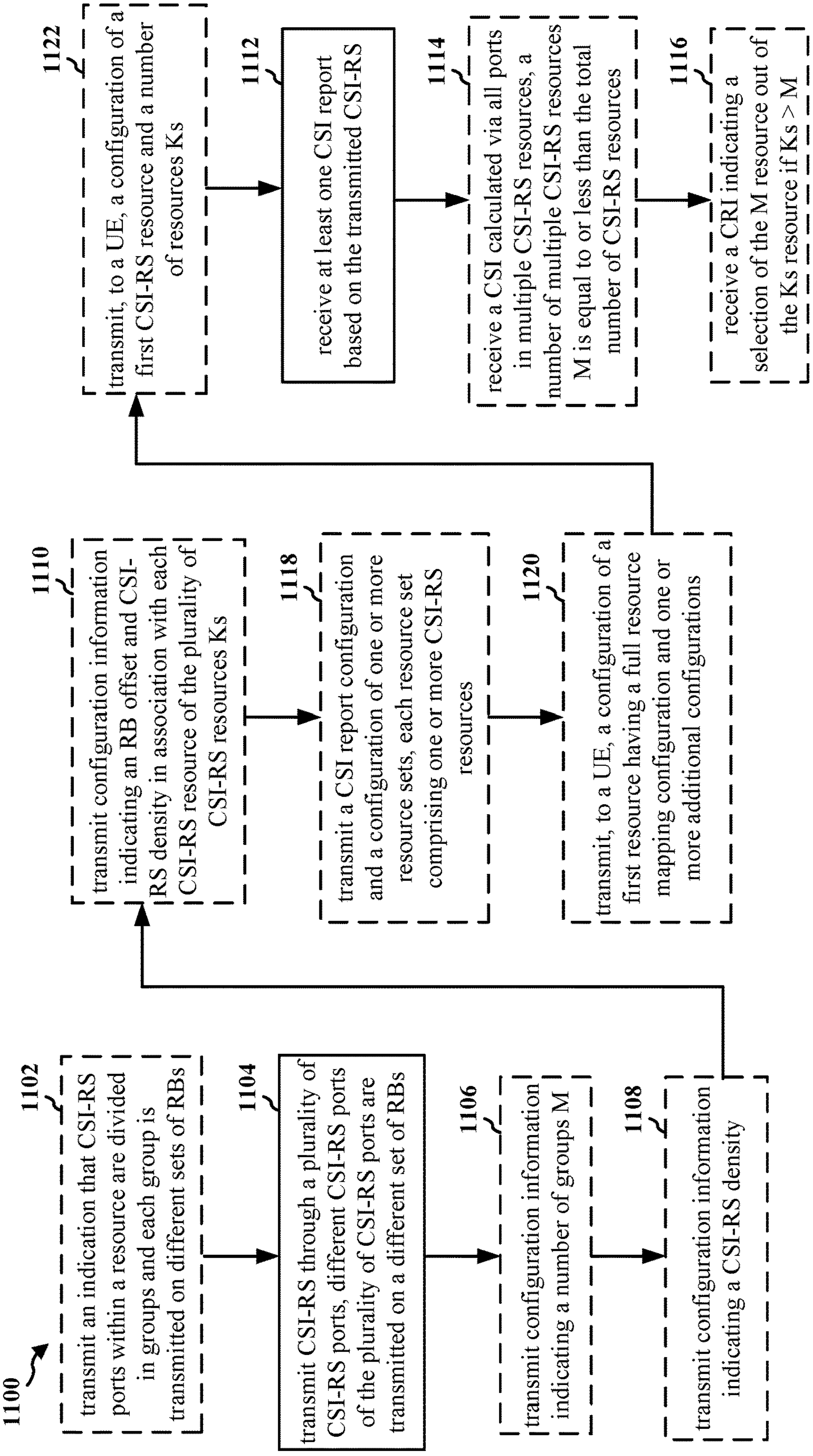
FIG. 11 is a flowchart of a method of wireless communication.

FIG. 11 is a flowchart 1100 of a method of wireless communication. The method may be performed by a base station or a component of a base station (e.g., the base station 102/180, 804; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to transmit a plurality of CSI-RS ports where different ports may be transmitted on different set of RBs within the frequency band of the CSI-RS.

In some aspects, for example at 1102, the base station may transmit an indication to the UE. For example, 1102 may be performed by indication component 1240 of apparatus 1202. The indication may indicate that the CSI-RS ports within a resource are divided in groups and each group is transmitted on different sets of RBs.

At 1104, the base station may transmit CSI-RS through a plurality of ports. For example, 1104 may be performed by CSI-RS component 1242 of apparatus 1202. Different CSI-RS ports of the plurality of CSI-RS ports may be transmitted on a different set of RBs. In some aspects, the plurality of CSI-RS ports may include N ports. The N ports may be divided into M groups, with $N_i$ ports in an i group of the M groups. In some aspects, the CSI-RS ports for each group may be transmitted on a corresponding set of RBs, such that the plurality of CSI-RS ports may be within one CSI-RS resource, and the M groups may be within the one CSI-RS. The CSI-RS ports for each group may be transmitted on different sets of RBs. In some aspects, the $N_i$ ports in the i group may be transmitted on every M RB within a set of RBs starting at RB i−1. In some aspects, the N ports may be divided evenly into the M groups, where $N_i=N_{i+1}$ for each i=1, 2, . . . , M−1. The N ports may be mapped sequentially into each group of the M groups. In some aspects, the plurality of CSI-RS ports may be within a plurality of CSI-RS resources Ks, wherein the CSI-RS ports within each resource may be transmitted on a corresponding set of RBs. The set of RBs on which the CSI-RS ports are transmitted may be different for different resources. In some aspects, the CSI-RS ports on each M selected resource may be transmitted on a different set of RBs. In some aspects, the value of M may be configured via RRC signaling. In some aspects, the value of M may be determined by a CSI-RS density.

In some aspects, for example at 1106, the base station may transmit configuration information. For example, 1106 may be performed by configuration component 1244 of apparatus 1202. The configuration information may indicate a number of groups M.

In some aspects, for example at 1108, the base station may transmit configuration information indicating a CSI-RS density. For example, 1108 may be performed by configuration component 1244 of apparatus 1202. The number of groups M may be based on the CSI-RS density.

In some aspects, for example at 1110, the base station may transmit configuration information indicating an RB offset and CSI-RS density. For example, 1110 may be performed by configuration component 1244 of apparatus 1202. The configuration information may indicate the RB offset and the CSI-RS density in association with each CSI-RS resource of the plurality of CSI-RS resources Ks.

In some aspects, for example at 1118, the base station may transmit a CSI report configuration and a configuration of one or more resource sets, wherein each resource may comprise one or more CSI-RS resources. For example, 1118 may be performed by configuration component 1244 of apparatus 1202. An association of a resource set from the CSI-RS resource to the CSI report configuration may be determined. The UE may determine the association of the resource set from the CSI-RS resource to the CSI report configuration. For example, the base station may transmit an NZP-CSI-RS resource set (e.g., NZP-CSI-RS Resource set) set comprising Ks resources via RRC signaling and/or transmit a configuration for CS-RS resource set and CSI report configuration association (e.g., CSI-AssociatedReportConfigInfo) to determine the association of a resource set to a CSI report configuration. In some aspects, the CSI-RS resource may comprise a plurality of parameters. In some aspects, one parameter of the plurality of parameters for different resources within the Ks resources may be different for each of the different resources. In some aspects, the one parameter may comprise an RB comb. Each of the different resources within the Ks resources may have a different RB comb. In some aspects, aggregated resources on a same RB comb may have a different RE location or a different symbol location. In some aspects, aggregated resources on a different RB comb may have at least one of the same RE location, the same symbol location, and/or the same CDM type.

In some aspects, for example at 1120, the base station may transmit a configuration of a first resource having a full resource mapping configuration and one or more additional configurations. For example, 1120 may be performed by configuration component 1244 of apparatus 1202. The base station may transmit the configuration of the first resource and the one or more additional configurations to the UE. In some aspects, the UE may determine a resource mapping configuration for an additional resource based at least on the full resource mapping configuration and the additional configuration. In some aspects, the additional configuration may comprise at least one of RE positions within a resource block for the additional resource, symbol positions within a slot for the additional resource, or a density configuration for the additional resource. With reference to diagram 1500 of FIG. 15, the NZP-CSI-RS resource 1502 may include one or more additional configurations 1504. In some aspects, the one or more additional configurations 1504 may comprise RE positions 1508 within a resource block for the additional resource. The one or more additional configurations, such as symbol location, density, CDM type, and number of ports may be similar to the full resource mapping configuration of the first resource. In some aspects, the one or more additional configurations 1504 may comprise symbol positions 1510 within a slot for the additional resource. The one or more additional configurations, such as RE position, density, CDM type, and number of ports may be similar to the full resource mapping configuration of the first resource. With reference to the diagram 1600 of FIG. 16, the symbol location for resources 1610, 1612, 1614, 1616 may be determined based on the one or more additional configurations (e.g., symbol configuration 1510), while the remaining parameters are based on the full resource mapping configuration of the first resource. In some aspects, the one or more additional configurations 1504 may comprise a density configuration and/or RB comb configuration 1506 for the additional resource. The one or more additional configurations, such as RE position, symbol location, CDM type, and number of ports may be similar to the full resource mapping configuration of the first resource. With reference to the diagram 1600 of FIG. 16, the RB comb for resources 1602, 1604, 1606, 1608 may be determined based on the one or more additional configurations (e.g., RB comb configuration 1506), while the remaining parameters are based on the full resource mapping configuration of the first resource.

In some aspects, for example at 1122 the base station may transmit a configuration of a first CSI-RS resource and a configuration comprising an additional configuration comprising a number of resources Ks. For example, 1122 may be performed by configuration component 1244 of apparatus 1202. The base station may transmit the configuration of the first CSI-RS resource and a configuration comprising the additional configuration comprising the number of resources Ks to the UE. In some aspects, the UE may determine a density configuration or an RB comb for each of the resources Ks. The UE may determine the density configuration or the RB comb for each of the resources Ks based on a value of Ks and a density configuration and an RB comb configured for the first CSI-RS resource. In some aspects, the additional configuration may further comprise at least one of an RE location, a symbol location, a CDM type, a slot offset, a periodicity. In some aspects, the additional configuration may follow the same configuration as the configuration for the first CSI-RS resource. In some aspects, the number of Ks may be configured in a CSI report configuration or a parameter of a codebook configuration.

In some aspects, the CSI report configuration may comprise a configuration for a CSI-IM associated with multiple channel measurement resources. In some aspects, the CSI report configuration may comprise Ks channel measurement resources used to generate a single CSI associated with Ks common CSI-IM resources. In some aspects, the plurality of CSI-RS resources Ks may be used to calculate at least one CSI to count a single CPU. The CPU may comprise Ks*P active ports, where P is a number of ports per CSI-RS resource Ks.

At 1112, the base station may receive at least one CSI report. For example, 1112 may be performed by CSI component 1246 of apparatus 1202. The base station may receive the at least one CSI report from the UE based on the transmitted CSI-RS.

In some aspects, for example at 1114, the base station may receive a CSI. For example, 1114 may be performed by CSI component 1246 of apparatus 1202. The base station may receive the CSI calculated via all ports in multiple CSI-RS resources. In some aspects, the number of multiple CSI-RS resources M may be equal to the total number of CSI-RS resources. In some aspects, the number of multiple CSI-RS resources M may be less than the total number of CSI-RS resources. In some aspects, the CSI may comprise at least one of a PMI, an RI, or a CQI.

In some aspects, for example at 1116, the base station may receive a CRI. For example, 1116 may be performed by CRI component 1248 of apparatus 1202. The base station may receive the CRI from the UE. The CRI may indicate a selection of the M resource out of the Ks resources if Ks>M.

Figure 12:
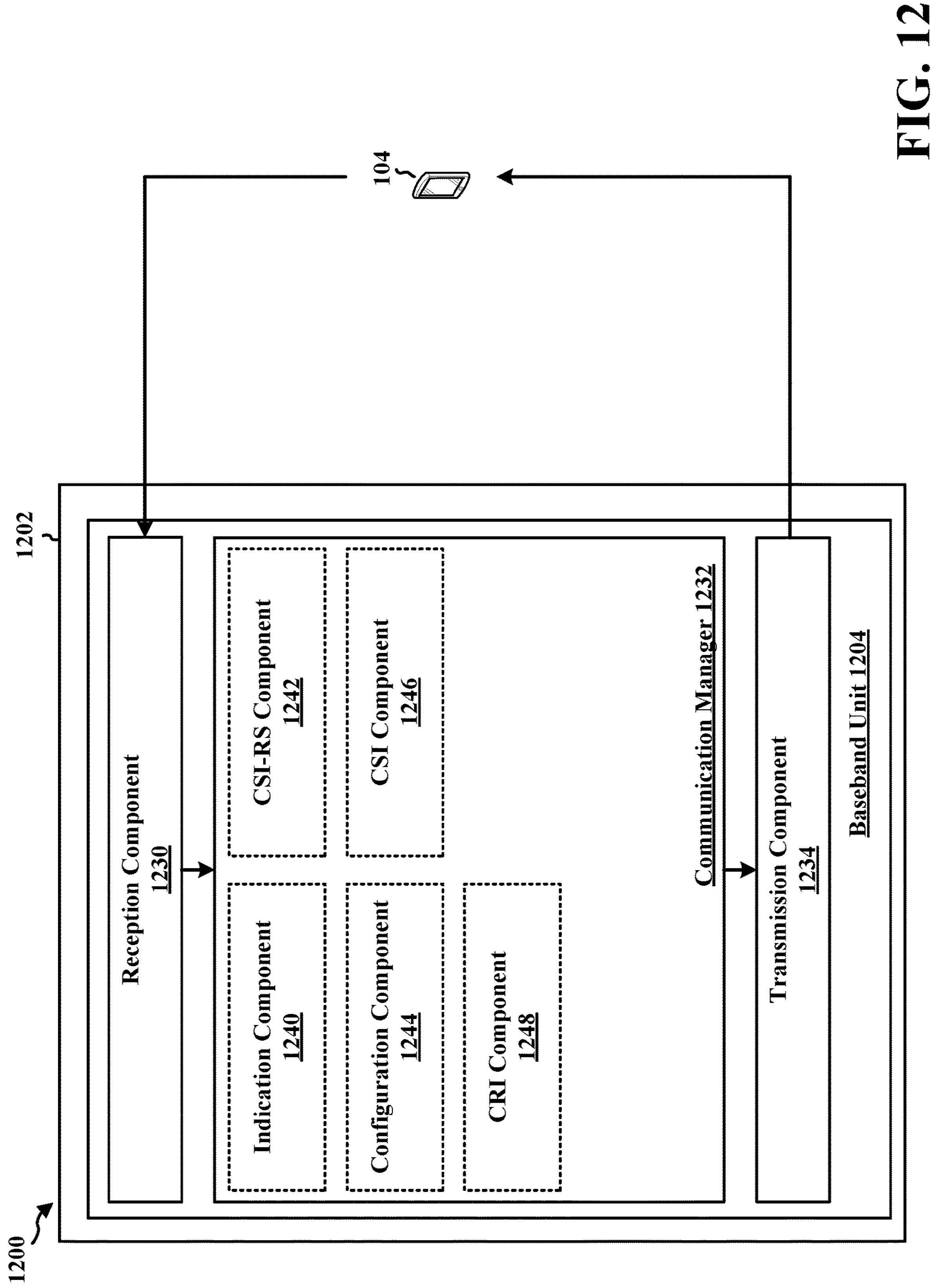
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes an indication component 1240 that is configured to transmit an indication, e.g., as described in connection with 1102 of FIG. 11. The communication manager 1232 further includes a CSI-RS component 1242 that is configured to transmit CSI-RS through a plurality of ports, e.g., as described in connection with 1104 of FIG. 11. The communication manager 1232 further includes a configuration component 1244 that is configured to transmit configuration information, e.g., as described in connection with 1106 of FIG. 11. The configuration component 1244 may be configured to transmit configuration information indicating a CSI-RS density, e.g., as described in connection with 1108 of FIG. 11. The configuration component 1244 may be configured to transmit configuration information indicating an RB offset and CSI-RS density, e.g., as described in connection with 1110 of FIG. 11. The configuration component 1244 may be configured to transmit a CSI report configuration and a configuration of one or more resource sets, e.g., as described in connection with 1118 of FIG. 11. The configuration component 1244 may be configured to transmit a configuration of a first resource having a full resource mapping configuration and an additional configuration, e.g., as described in connection with 1120 of FIG. 11. The configuration component 1244 may be configured to transmit a configuration of a first CSI-RS resource and a configuration comprising an additional configuration comprising a number of resources Ks, e.g., as described in connection with 1122 of FIG. 11. The communication manager 1232 further includes a CSI component 1246 that is configured to receive at least one CSI report, e.g., as described in connection with 1112 of FIG. 11. The CSI component 1246 may be configured to receive the CSI calculated via all ports in multiple CSI-RS resources, e.g., as described in connection with 1114 of FIG. 11. The communication manager 1232 further includes a CRI component 1248 that is configured to receive a CRI, e.g., as described in connection with 1116 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting CSI-RS through a plurality of CSI-RS ports. Different CSI-RS ports of the plurality of CSI-RS ports are transmitted on a different set of RBs. The apparatus includes means for receiving at least one CSI report based on the transmitted CSI-RS. The apparatus further includes means for transmitting an indication to the UE, the indication indicates that the CSI-RS ports within a resource are divided in groups and each group is transmitted on different sets of RBs. The apparatus further includes means for transmitting configuration information indicating a number of groups M. The apparatus further includes means for transmitting configuration information indicating a CSI-RS density. A number of groups M is based on the CSI-RS density. The apparatus further includes means for transmitting configuration information indicating an RB offset and CSI-RS density in association with each CSI-RS resource of the plurality of CSI-RS resources Ks. The apparatus further includes means for receiving a CSI calculated via all ports in multiple CSI-RS resources. The number of multiple CSI-RS resources M is equal to or less than the total number of CSI-RS resources. The CSI comprises at least one of a PMI, an RI, or a CQI. The apparatus further includes means for receiving a CRI indicating a selection of the M resource out of the Ks resource if Ks>M. The apparatus further includes means for transmitting N resources including a CSI-RS resource and a CSI report configuration, wherein an association of a resource set from the CSI-RS resource to the CSI report configuration is determined. The apparatus further includes means for transmitting, to a UE, a configuration of a first resource having a full resource mapping configuration and an additional configuration. The UE determines a resource mapping configuration for an additional resource based at least on the full resource mapping configuration and the additional configuration. The apparatus further includes means for transmitting, to a UE, a configuration of a first CSI-RS resource and a number of resources Ks. The UE determines a density configuration or an RB comb for each of the resources Ks based on a value of Ks and a density configuration and an RB comb configured for the first CSI-RS resource. The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a UE comprising receiving CSI-RS through a plurality of CSI-RS ports, wherein different CSI-RS ports of the plurality of CSI-RS ports are transmitted on a different set of RBs; and reporting at least one CSI report based on CSI-RS pattern.

In Aspect 2, the method of Aspect 1 further includes that the plurality of CSI-RS ports includes N ports, the N ports are divided into M groups, with $N_i$ ports in an i group of the M groups, and the CSI-RS ports for each group are transmitted on a corresponding set of RBs, wherein the plurality of CSI-RS ports is within one CSI-RS resource, and the M groups are within the one CSI-RS.

In Aspect 3, the method of Aspect 1 or 2 further includes that the CSI-RS ports for each group are transmitted on a different sets of RBs.

In Aspect 4, the method of any of Aspects 1-3 further includes that the $N_i$ ports in the i group are transmitted on every M RB within a set of RBs starting at RB i−1.

In Aspect 5, the method of any of Aspects 1-4 further includes receiving an indication, from a base station, the indication indicates that the CSI-RS ports within a resource are divided in groups and each group is transmitted on different sets of RBs; and receiving the CSI-RS based on the indication.

In Aspect 6, the method of any of Aspects 1-5 further includes receiving configuration information indicating a number of groups M.

In Aspect 7, the method of any of Aspects 1-6 further includes receiving configuration information indicating a CSI-RS density, wherein a number of groups M is based on the CSI-RS density.

In Aspect 8, the method of any of Aspects 1-7 further includes that the N ports are divided evenly into the M groups, where $N_i=N_{i+1}$ for each i=1, 2, . . . , M−1.

In Aspect 9, the method of any of Aspects 1-8 further includes that the N ports are mapped sequentially into each group of the M groups.

In Aspect 10, the method of any of Aspects 1-9 further includes that the plurality of CSI-RS ports is within a plurality of CSI-RS resources Ks, wherein the CSI-RS ports within each resource is transmitted on a corresponding set of RBs.

In Aspect 11, the method of any of Aspects 1-10 further includes that the set of RBs on which the CSI-RS ports are transmitted are different for different resources.

In Aspect 12, the method of any of Aspects 1-11 further includes receiving configuration information indicating an RB offset and CSI-RS density in association with each CSI-RS resource of the plurality of CSI-RS resources Ks.

In Aspect 13, the method of any of Aspects 1-12 further includes transmitting a CSI calculated via all ports in multiple CSI-RS resources wherein a number of multiple CSI-RS resources M is equal to or less than the total number of CSI-RS resources, the CSI comprises at least one of a PMI, a RI, or a CQI.

In Aspect 14, the method of any of Aspects 1-13 further includes transmitting a CSI-RS resource indicator (CRI) indicating a selection of the M resource out of the Ks resource if Ks>M.

In Aspect 15, the method of any of Aspects 1-14 further includes that the CSI-RS ports on each M selected resource is transmitted on a different set of RBs.

In Aspect 16, the method of any of Aspects 1-15 further includes that a value of M is configured via RRC signaling.

In Aspect 17, the method of any of Aspects 1-16 further includes that a value of M is determined by a CSI-RS density.

In Aspect 18, the method of any of Aspects 1-17 further includes determining, for each port in the selected M resource, a port-index remapping based on a resource index and a local index in the selected M resource.

In Aspect 19, the method of any of Aspects 1-18 further includes that a CQI is calculated by mapping a PMI to the CSI-RS ports after the port-index remapping.

In Aspect 20, the method of any of Aspects 1-19 further includes that the CSI-RS resource within the CSI-RS resource set comprises a plurality of parameters, wherein one parameter of the plurality of parameters for different resources within the Ks resources is different for each of the different resources.

In Aspect 21, the method of any of Aspects 1-20 further includes that the one parameter comprises an RB comb, wherein each of the different resources within the Ks resources have a different RB comb.

In Aspect 22, the method of any of Aspects 1-21 further includes that aggregated resources of the Ks resources on a same RB comb have a different RE location or a different symbol location.

In Aspect 23, the method of any of Aspects 1-22 further includes that aggregated resources of the Ks resources on a different RB comb have at least one of a same RE location, a same symbol location, or a same CDM type.

In Aspect 24, the method of any of Aspects 1-23 further includes receiving a configuration of a first resource having a full resource mapping configuration and one or more additional configurations; and determining a resource mapping configuration for an additional resource based at least on the full resource mapping configuration and the one or more additional configurations.

In Aspect 25, the method of any of Aspects 1-24 further includes that the one or more additional configurations comprise RE positions within a resource block for the additional resource.

In Aspect 26, the method of any of Aspects 1-25 further includes that the one or more additional configurations comprise symbol positions within a slot for the additional resource.

In Aspect 27, the method of any of Aspects 1-26 further includes that the one or more additional configurations comprise a density or RB comb configuration for the additional resource.

In Aspect 28, the method of any of Aspects 1-27 further includes receiving a configuration of a first CSI-RS resource and an additional configuration comprising a number of resources Ks; and determining a density configuration or an RB comb for each of the resources Ks based on a value of Ks and a density configuration and an RB comb configured for the first CSI-RS resource.

In Aspect 29, the method of any of Aspects 1-28 further includes that the CSI report configuration comprises a configuration for a CSI-IM associated with multiple channel measurement resources.

In Aspect 30, the method of any of Aspects 1-29 further includes that the CSI report configuration comprises Ks channel measurement resources used to generate a single CSI associated with Ks common CSI-IM resources.

In Aspect 31, the method of any of Aspects 1-30 further includes that the plurality of CSI-RS resources Ks which are used to calculate at least one CSI count a single CPU.

In Aspect 32, the method of any of Aspects 1-31 further includes that the plurality of CSI-RS resources Ks which are used to calculate at least one CSI count one active CSI-RS resource, wherein the one active resource comprises Ks*P active ports.

Aspect 33 is a device including one or more processors and one or more memories in electronic communication with the one or more processors storing instructions executable by the one or more processors to cause the system or apparatus to implement a method as in any of Aspects 1-32.

Aspect 34 is a system or apparatus including means for implementing a method or realizing an apparatus as in any of Aspects 1-32.

Aspect 35 is a non-transitory computer readable medium storing instructions executable by one or more processors to cause the one or more processors to implement a method as in any of Aspects 1-32.

Aspect 36 is a method of wireless communication at a base station comprising transmitting CSI-RS through a plurality of CSI-RS ports, wherein different CSI-RS ports of the plurality of CSI-RS ports are transmitted on a different set of RBs; and receiving at least one CSI report based on the transmitted CSI-RS.

In Aspect 37, the method of Aspect 36 further includes that the plurality of CSI-RS ports includes N ports, the N ports are divided into M groups, with $N_i$ ports in an i group of the M groups, and the CSI-RS ports for each group are transmitted on a corresponding set of RBs, wherein the plurality of CSI-RS ports is within one CSI-RS resource, and the M groups are within the one CSI-RS.

In Aspect 38, the method of Aspect 36 or 37 further includes that the CSI-RS ports for each group are transmitted on a different sets of RBs.

In Aspect 39, the method of any of Aspects 36-38 further includes that the $N_i$ ports in the i group are transmitted on every M RB within a set of RBs starting at RB i−1.

In Aspect 40, the method of any of Aspects 36-39 further includes transmitting an indication to a UE, the indication indicates that the CSI-RS ports within a resource are divided in groups and each group is transmitted on different sets of RBs.

In Aspect 41, the method of any of Aspects 36-40 further includes transmitting configuration information indicating a number of groups M.

In Aspect 42, the method of any of Aspects 36-41 further includes transmitting configuration information indicating a CSI-RS density, wherein a number of groups M is based on the CSI-RS density.

In Aspect 43, the method of any of Aspects 36-42 further includes that the N ports are divided evenly into the M groups, where $N_i=N_{i+1}$ for each i=1, 2, . . . , M−1.

In Aspect 44, the method of any of Aspects 36-43 further includes that the N ports are mapped sequentially into each group of the M groups.

In Aspect 45, the method of any of Aspects 36-44 further includes that the plurality of CSI-RS ports is within a plurality of CSI-RS resources Ks, wherein the CSI-RS ports within each resource is transmitted on a corresponding set of RBs.

In Aspect 46, the method of any of Aspects 36-45 further includes that the set of RBs on which the CSI-RS ports are transmitted are different for different resources.

In Aspect 47, the method of any of Aspects 36-46 further includes transmitting configuration information indicating an RB offset and CSI-RS density in association with each CSI-RS resource of the plurality of CSI-RS resources Ks.

In Aspect 48, the method of any of Aspects 36-47 further includes receiving a CSI calculated via all ports in multiple CSI-RS resources wherein a number of multiple CSI-RS resources M is equal to or less than a total number of CSI-RS resources, the CSI comprises at least one of a PMI, an RI, or a CQI.

In Aspect 49, the method of any of Aspects 36-48 further includes receiving a CRI indicating a selection of the M resource out of the Ks resource if Ks>M.

In Aspect 50, the method of any of Aspects 36-49 further includes that the CSI-RS ports on each M selected resource is transmitted on a different set of RBs.

In Aspect 51, the method of any of Aspects 36-50 further includes that a value of M is configured via RRC signaling.

In Aspect 52, the method of any of Aspects 36-51 further includes that a value of M is determined by a CSI-RS density.

In Aspect 53 the method of any of Aspects 36-52 further includes that the CSI-RS resource within the CSI-RS resource set comprises a plurality of parameters, wherein one parameter of the plurality of parameters for different resources within the Ks resources is different for each of the different resources.

In Aspect 54, the method of any of Aspects 36-53 further includes that the one parameter comprises an RB comb, wherein each of the different resources within the Ks resources have a different RB comb.

In Aspect 55, the method of any of Aspects 36-54 further includes that aggregated resources of the Ks resources on a same RB comb have a different RE location or a different symbol location.

In Aspect 56, the method of any of Aspects 36-55 further includes that aggregated resources of the Ks resources on a different RB comb have at least one of a same RE location, a same symbol location, or a same CDM type.

In Aspect 57, the method of any of Aspects 36-56 further includes transmitting, to a UE, a configuration of a first resource having a full resource mapping configuration and one or more additional configurations, wherein the UE determines a resource mapping configuration for an additional resource based at least on the full resource mapping configuration and the one or more additional configurations.

In Aspect 58, the method of any of Aspects 36-57 further includes that the one or more additional configurations comprise at least one of RE positions within a resource block for the additional resource, symbol positions within a slot for the additional resource, or a density configuration for the additional resource.

In Aspect 59, the method of any of Aspects 36-58 further includes transmitting, to a UE, a configuration of a first CSI-RS resource and a number of resources Ks, wherein the UE determines a density configuration or an RB comb for each of the resources Ks based on a value of Ks and a density configuration and an RB comb configured for the first CSI-RS resource.

In Aspect 60, the method of any of Aspects 36-59 further includes that the CSI report configuration comprises a configuration for a CSI-IM associated with multiple channel measurement resources.

In Aspect 61, the method of any of Aspects 36-60 further includes that the CSI report configuration comprises Ks channel measurement resources used to generate a single CSI associated with Ks common CSI-IM resources.

In Aspect 62, the method of any of Aspects 36-61 further includes that the plurality of CSI-RS resources Ks which are used to calculate at least one CSI count one active CSI-RS, wherein the one active resource comprises Ks*P active ports.

Aspect 63 is a device including one or more processors and one or more memories in electronic communication with the one or more processors storing instructions executable by the one or more processors to cause the system or apparatus to implement a method as in any of Aspects 36-62.

Aspect 64 is a system or apparatus including means for implementing a method or realizing an apparatus as in any of Aspects 36-62.

Aspect 65 is a non-transitory computer readable medium storing instructions executable by one or more processors to cause the one or more processors to implement a method as in any of Aspects 36-62.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
memory; and
at least one processor coupled to the memory and configured to:
receive channel state information (CSI) reference signals (RS) (CSI-RS) through a plurality of CSI-RS ports, wherein different CSI-RS ports of the plurality of CSI-RS ports correspond to a different set of resource blocks (RBs); and
report at least one CSI based on a CSI-RS pattern, wherein the CSI-RS pattern corresponds to a port selection and a set of linear combination coefficients, wherein the port selection is based on a subset of a plurality of CSI-RS resources Ks, and wherein each CSI-RS resource in the subset corresponds to one of the different set of RBs, wherein the plurality of CSI-RS ports is within the plurality of CSI-RS resources Ks, Ks being an integer greater than or equal to two, wherein the CSI-RS ports within each resource is based on a corresponding set of RBs;
receive a configuration of a first resource having a full resource mapping configuration and one or more additional configurations; and
determine a resource mapping configuration for an additional resource based at least on the full resource mapping configuration and the one or more additional configurations.

2. The apparatus of claim 1, wherein the CSI-RS resource within the CSI-RS resource set comprises a plurality of parameters, wherein one parameter of the plurality of parameters for different resources within the Ks resources is different for each of the different resources.

3. The apparatus of claim 2, wherein the one parameter comprises a resource block (RB) comb, wherein each of the different resources within the Ks resources have a different RB comb.

4. The apparatus of claim 1, wherein aggregated resources of the Ks resources on a same resource block (RB) comb have a different resource element (RE) location or a different symbol location.

5. The apparatus of claim 4, wherein aggregated resources of the Ks resources on a different RB comb have at least one of a same resource element (RE) location, a same symbol location, or a same code division multiplexing (CDM) type.

6. The apparatus of claim 1, wherein the one or more additional configurations comprise at least one of resource element (RE) positions within a resource block for the additional resource, symbol positions within a slot for the additional resource, or a density or RB comb configuration for the additional resource.

7. The apparatus of claim 1, wherein the at least one processor is further configured to:
reindex the plurality of CSI-RS ports based on a resource index and a port index within the resource.

8. The apparatus of claim 7, wherein the at least one processor is further configured to reindex the plurality of CSI-RS ports based on at least one of across ports within one resource and across ports in different resources or across a first half of ports within a first resource and across a first half of ports within a second resource, across a second half of ports of the first resource and across a second half of ports of the second resource.

9. The apparatus of claim 1, wherein the at least one processor is further configured to:
receive a configuration of a first CSI-RS resource and an additional configuration comprising a number of resources Ks; and
determine a density configuration or an RB comb for each of the resources Ks based on a value of Ks and a density configuration and an RB comb configured for the first CSI-RS resource.

10. The apparatus of claim 1, wherein the CSI report configuration comprises a configuration for a CSI interference measurement (IM) (CSI-IM) associated with multiple channel measurement resources.

11. The apparatus of claim 1, wherein the CSI report configuration comprises Ks channel measurement resources used to generate a single CSI associated with Ks common CSI interference measurement (IM) (CSI-IM) resources.

12. The apparatus of claim 1, wherein the at least one processor is further configured to count the plurality of CSI-RS resources Ks which are used to calculate at least one CSI as a single CSI processing unit (CPU).

13. The apparatus of claim 1, wherein the at least one processor is further configured to count the plurality of CSI-RS resources Ks which are used to calculate at least one CSI as a single active CSI-RS resource, wherein the one active resource comprises Ks*P active ports, where P is a number of ports per CSI-RS resource Ks.

14. The apparatus of claim 1, wherein the plurality of CSI-RS ports includes N ports, the N ports are divided into M groups, with Ni ports in an i group of the M groups, and the CSI-RS ports for each group are transmitted on a corresponding set of RBs, wherein the plurality of CSI-RS ports is within one CSI-RS resource, and the M groups are within the one CSI-RS.

15. A method of wireless communication of a user equipment (UE), comprising:
receiving channel state information (CSI) reference signals (RS) (CSI-RS) through a plurality of CSI-RS ports, wherein different CSI-RS ports of the plurality of CSI-RS ports correspond to a different set of resource blocks (RBs);
reporting at least one CSI based on a CSI-RS pattern, wherein the CSI-RS pattern corresponds to a port selection and a set of linear combination coefficients, wherein the port selection is based on a subset of a plurality of CSI-RS resources Ks, and wherein each CSI-RS resource in the subset corresponds to one of the different set of RBs, wherein the plurality of CSI-RS ports is within the plurality of CSI-RS resources Ks, Ks being an integer greater than or equal to two, wherein the CSI-RS ports within each resource is based on a corresponding set of RBs;

receiving a configuration of a first resource having a full resource mapping configuration and one or more additional configurations; and determining a resource mapping configuration for an additional resource based at least on the full resource mapping configuration and the one or more additional configurations.

16. An apparatus for wireless communication at a base station, comprising:

memory; and at least one processor coupled to the memory and configured to:

transmit channel state information (CSI) reference signals (RS) (CSI-RS) through a plurality of CSI-RS ports, wherein different CSI-RS ports of the plurality of CSI-RS ports are transmitted on a different set of resource blocks (RBs;

receive at least one CSI report based on the transmitted CSI-RS, wherein the at least one CSI report corresponds to a port selection and a set of linear combination coefficients, wherein the port selection is based on a subset of a plurality of CSI-RS resources Ks, and wherein each CSI-RS resource in the subset corresponds to one of the different set of RBs wherein Ks being an integer greater than or equal to two; and transmit, to a user equipment (UE), a configuration of a first resource having a full resource mapping configuration and one or more additional configurations, wherein the UE determines a resource mapping configuration for an additional resource based at least on the full resource mapping configuration and the one or more additional configurations.

17. The apparatus of claim 16, wherein the plurality of CSI-RS ports is within the plurality of CSI-RS resources Ks, Ks being an integer greater than or equal to two, wherein the CSI-RS ports within each resource is based on a corresponding set of RBs.

18. The apparatus of claim 17, wherein the CSI-RS resource within the CSI-RS resource set comprises a plurality of parameters, wherein one parameter of the plurality of parameters for different resources within the Ks resources is different for each of the different resources.

19. The apparatus of claim 18, wherein the one parameter comprises a resource block (RB) comb, wherein each of the different resources within the Ks resources have a different RB comb.

20. The apparatus of claim 18, wherein aggregated resources of the Ks resources on a same resource block (RB) comb have a different resource element (RE) location or a different symbol location.

21. The apparatus of claim 18, wherein aggregated resources of the Ks resources on a different RB comb have at least one of a same resource element (RE) location, a same symbol location, or a same code division multiplexing (CDM) type.

22. The apparatus of claim 17, wherein the plurality of CSI-RS resources Ks which are used to calculate at least one CSI correspond to a single active CSI-RS, wherein the one active resource comprises Ks*P active ports, where P is a number of ports per CSI-RS resource Ks.

23. The apparatus of claim 16, wherein the one or more additional configurations comprise at least one of resource element (RE) positions within a resource block for the additional resource, symbol positions within a slot for the additional resource, or a density configuration for the additional resource.

24. The apparatus of claim 16, wherein the at least one processor is further configured to:

transmit, to a user equipment (UE), a configuration of a first CSI-RS resource and a number of resources Ks, wherein the UE determines a density configuration or an RB comb for each of the resources Ks based on a value of Ks and a density configuration and an RB comb configured for the first CSI-RS resource.

25. The apparatus of claim 16, wherein the CSI report configuration comprises a configuration for a CSI interference measurement (IM) (CSI-IM) associated with multiple channel measurement resources.

26. The apparatus of claim 16, wherein the CSI report configuration comprises Ks channel measurement resources used to generate a single CSI associated with Ks common CSI interference measurement (IM) (CSI-IM) resources.

27. A method of wireless communication of a base station (BS), comprising:

transmitting channel state information (CSI) reference signals (RS) (CSI-RS) through a plurality of CSI-RS ports, wherein different CSI-RS ports of the plurality of CSI-RS ports are transmitted on a different set of resource blocks (RBs); and receiving at least one CSI report based on the transmitted CSI-RS, wherein the at least one CSI report corresponds to a port selection and a set of linear combination coefficients, wherein the port selection is based on a subset of a plurality of CSI-RS resources Ks, and wherein each CSI-RS resource in the subset corresponds to one of the different set of RBs, wherein Ks being an integer greater than or equal to two; and transmitting, to a user equipment (UE), a configuration of a first resource having a full resource mapping configuration and one or more additional configurations, wherein the UE determines a resource mapping configuration for an additional resource based at least on the full resource mapping configuration and the one or more additional configurations.

* * * * *